(12) United States Patent
Sun

(10) Patent No.: US 11,444,752 B2
(45) Date of Patent: Sep. 13, 2022

(54) SYSTEMS AND METHODS FOR DATA ENCRYPTION AND DECRYPTION IN DATA TRANSMISSION

(71) Applicant: BEIJING DIDI INFINITY TECHNOLOGY AND DEVELOPMENT CO., LTD., Beijing (CN)

(72) Inventor: Yang Sun, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 154 days.

(21) Appl. No.: 16/726,871

(22) Filed: Dec. 25, 2019

(65) Prior Publication Data

US 2020/0145203 A1 May 7, 2020

Related U.S. Application Data

(63) Continuation of application No. PCT/CN2018/093962, filed on Jul. 2, 2018.

(30) Foreign Application Priority Data

Jul. 6, 2017 (CN) .......................... 201710545255.X
Jul. 12, 2017 (CN) .......................... 201710565512.6

(51) Int. Cl.
*H04L 9/08* (2006.01)
*H04L 9/06* (2006.01)

(52) U.S. Cl.
CPC .......... *H04L 9/0825* (2013.01); *H04L 9/0618* (2013.01); *H04L 9/0643* (2013.01); *H04L 9/0869* (2013.01); *H04L 9/0891* (2013.01)

(58) Field of Classification Search
CPC ... H04L 9/0825; H04L 9/0618; H04L 9/0643; H04L 9/0869; H04L 9/0891;
(Continued)

(56) References Cited

U.S. PATENT DOCUMENTS

| 7,921,292 B1 | 4/2011 | Pauker et al. |
| 2015/0169875 A1 | 6/2015 | Ide et al. |
| 2017/0006029 A1* | 1/2017 | Pedersen ................. H04W 4/80 |

FOREIGN PATENT DOCUMENTS

| CN | 103067166 A | 4/2013 |
| CN | 103297225 A | 9/2013 |

(Continued)

OTHER PUBLICATIONS

Jianchang Lai, "Improved Identity-Based Online/Offline Encryption", DOI: 10.1007/978-3-319-19962-7_10, ACISP 2015, LNCS 9144, pp. 160-173, 2015, 14 pages (Year: 2015).*

(Continued)

*Primary Examiner* — Carl G Colin
*Assistant Examiner* — Han Yang
(74) *Attorney, Agent, or Firm* — Metis IP LLC

(57) ABSTRACT

A method for decrypting an encrypted message in a cluster may be provided. The method may include generating, by a first private key generator, one or more system parameters and a master key using a security parameter of the cluster and a depth of the maximum of a unit vector, the cluster including a first member and a second member. The method may also include generating, by the first private key generator, a private key of the first member; The method may further include generating, by a second private key generator, a private key of the second member based on the one or more system parameters, the identification vector of the first member, the private key of the first member, and an identification vector of the second member; The method may still (Continued)

further include decrypting the encrypted message the private key of the first member or the second member.

10 Claims, 12 Drawing Sheets

(58) Field of Classification Search
CPC ..... H04L 9/0836; H04L 9/088; H04L 9/3073; H04L 9/0866; H04L 9/14; H04L 9/3066; H04L 9/0819; H04L 9/0861; H04L 9/30; H04L 2209/76; H04L 63/0442; H04L 63/0428; H04L 63/0471; H04L 63/06; H04L 63/083; H04L 63/0876
See application file for complete search history.

(56) References Cited

FOREIGN PATENT DOCUMENTS

| | | |
|---|---|---|
| CN | 103986574 A | 8/2014 |
| CN | 104038936 A | 9/2014 |
| CN | 104135473 A | 11/2014 |
| CN | 104168108 A | 11/2014 |
| CN | 104320249 A | 1/2015 |
| CN | 104780532 A | 7/2015 |
| CN | 104883254 A | 9/2015 |
| CN | 105141419 A | 12/2015 |
| CN | 105635135 A | 6/2016 |
| CN | 106027240 A | 10/2016 |
| EP | 2247130 A1 | 11/2010 |
| WO | 2013056502 A1 | 4/2013 |

OTHER PUBLICATIONS

Jie Cui, "OOABKS: Online/offline attribute-based encryption for keyword search in mobile cloud", https://doi.org/10.1016/j.ins.2019.03.043, Elsevier Inc. Information Sciences, 2019, 15 pages (Year: 2019).*

Vipul Goyal, "Attribute-Based Encryption for Fine-Grained Access Control of Encrypted Data", CCS'06, Oct. 30-Nov. 3, 2006, 10 pages (Year: 2006).*

Susan Hohenberger et al., Online/offline Attribute-Based Encryption, Springer, 293-310, 2014.

Min Xiao et al., A Hybrid Scheme for Fine-Grained Search and Access Authorization in Fog Computing Environment, Sensors, 17, 1-22, 2017.

Zhiwei Wang et al., Attribute-Based Online/Offline Encryption in Smart Grid, IEEE, 1-5, 2015.

International Search Report in PCT/CN2018/093962 dated Sep. 21, 2018, 4 pages.

Written Opinion in PCT/CN2018/093962 dated Sep. 21, 2018, 4 pages.

Li, Dawei et al., Secure and Anonymous Data Transmission System for Cluster Organised Space Information Network, 2016 IEEE International Conference on Smart Cloud, 228-233, 2016.

Dan Boneh et al., Identity-Based Encryption from the Weil Pairing, CRYPTO 2001, LNCS 2139, 213-229, 2001.

The Partial Supplementary Search Report in European Application No. 18827643.0 dated May 27, 2020, 10 pages.

First Office Action in Chinese Application No. 202010647264.1 dated Jan. 6, 2022, 13 pages.

* cited by examiner

600

┌─────────────────────────────────────────────┐
│ Generating one or more system parameters and a master │
│ key based on an initialization function using a security │
│ parameter relating to a cluster, a depth of the maximum of a │
│ unit vector, the cluster including one or more first members │ ~ 602
│ and one or more second members │
└─────────────────────────────────────────────┘
                      ↓
┌─────────────────────────────────────────────┐
│ Generating a private key of the first member based on the │ ~ 604
│ system parameters, the master key, and an identification │
│ vector relating to the first member │
└─────────────────────────────────────────────┘
                      ↓
┌─────────────────────────────────────────────┐
│ Generate a private key of the second member based on the │
│ system parameters, the identification vector relating to the │ ~ 606
│ first member, the private key of the first member, and an │
│ identification vector of the second member │
└─────────────────────────────────────────────┘
                      ↓
┌─────────────────────────────────────────────┐
│ When the first member or the second number is a recipient │
│ and receives an encrypted message from a sender, │
│ determining an initial message to be transmitted by │ ~ 608
│ decrypting the encrypted message using the system │
│ parameters and the private of the recipient │
└─────────────────────────────────────────────┘

Determining a prime based on a security parameter $\lambda$ and a private key generator; selecting an elliptic curve; determining groups $G$ and $G_T$ based on points on the elliptic curve; and mapping points of the group $G$ to the group $G_T$ using a map function $e$ to generate bilinear groups ~902

↓

Determining a revocation identify domain and a validation domain; selecting a Hash function UCH and an auxiliary parameter domain; determining random numbers $g$, $h$ and random exponents $a$, $b$; and generating a public key parameter $pp$ and a master key $msk$ ~904

↓

Selecting a random exponent $t$; obtaining an identify attribute of a user; and determining a private key $sk1$ for the user based on the random exponent $t$, the identify attribute, and the master key $msk$ ~906

↓

Randomly selecting a first revocation set; obtaining a Hash function pair; selecting a random number $r'$; determining a dynamic verified identify; selecting a random number $s$ and a random exponent $s_i$ and $s_v$; determining cipher text; and determining the session key of the offline data and the proxy cipher text of the offline data ~908

↓

Obtaining a second revocation set; determining $I_{mall,i}$; determining a cipher text $r$; and determining the session key of the offline data and the proxy cipher text of the offline data ~910

FIG. 9

SYSTEMS AND METHODS FOR DATA ENCRYPTION AND DECRYPTION IN DATA TRANSMISSION

CROSS-REFERENCE TO RELATED APPLICATIONS

This application is a continuation of International Application No. PCT/CN2018/093962, filed on Jul. 2, 2018, which claims priority to Chinese Patent Application No. 201710545255.X filed on Jul. 6, 2017, Chinese Patent Application No. 201710565512.6 filed on Jul. 12, 2017, the entire contents of each of which are hereby incorporated by reference.

TECHNICAL FIELD

This disclosure generally relates to communication technology, and more particularly, relates to systems and methods for data encryption and decryption.

BACKGROUND

In a cluster, a cluster head (CH) for managing cluster members is necessary. The cluster head may determine whether to accept a new member that is willing to join the cluster, track a sender of a message even though the message is anonymous, and remove malicious cluster members out of the cluster. An information network with the above features may be referred to as a cluster organization information network. Further, in order to ensure the security of message transmission in the cluster organization information network, a message transmitted in the cluster organization information network may be encrypted using a traditional encryption method, that is, a terminal of a sender of the message may encrypt the message with a public key, and a recipient may decrypt the cipher text with a private key. However, the data transmission in the cluster organization information network may have the following problems.

Firstly, the public key may be an irregular string. Thus, it is difficult to check it. However, an error in the public key may result in completely different cipher texts. In 1984, Shamir firstly proposed identity-based password systems and signature systems, in which a public key may be an ID (identification) of a recipient, and may be represented by the mail address or telephone number the of the recipient. Therefore, it is easy to check the correctness of the public key, and errors in the public key can be detected. In 2003, Boneh and Franklin established a complete mechanism of identity-based encryption (IBE) using Weil pairing. The proposed mechanism is safe under a selective cipher texts attack in a random prediction model, and a public key generator (PKG) is used in the information network to distribute a private key to each member.

Secondly, since all members of the cluster organization information network may receive private keys from the PKG, the PKG has to bear a heavy load to distribute keys to all members. What is even worse is, the entire private key generation process may be interrupted if the PKG is offline or out of work.

Moreover, the message transmitted in the cluster organization information network needs to be anonymous, such that an attacker may not find identity information of the sender based on the message. However, when a member of the cluster denies that he/she receives a message, or the information sent to the cluster member is illegal, the cluster head may track the identity information of sender based on the message so as to remove malicious cluster members.

Therefore, to ensure the security of message transmission in the cluster organization information network, and to avoid the PKG to bear the load of distributing the private key for decryption to all members of the cluster become a technical problem to be solved urgently.

In another aspect, mobile cloud computing becomes an infrastructure of most cloud-assisted networks, such as mobile payment. However, mobile computing is severely threatened by security risks. Data stored in a cloud opens to public, thus, it is required that data storage needs to be secured, and the access to data storage is only available for authorized users. Conventional encryption techniques only support limited access control mechanism, which are difficult to be applied in the mobile cloud computing. Public index predicate encryption is an emerging asymmetric encryption paradigm that allows fine-grained access control over encrypted data. In a public indexed predicate encryption system, the access control policy is especially important. Cipher text is associated with a cipher text attribute, and a private key is assigned to a key attribute. Only cipher text attributes embedded in a cipher text can be decrypted if a key attribute in a private key matches a pre-defined key. However, there are still many difficulties in the widespread use of public index predicate encryption in mobile cloud computing. Most public index predicate encryption schemes require a large amount of algebraic operations, and decryption time used when encrypted data is decrypted increases with growing cipher text attributes. This difficulty limits its application greatly. When a mobile device decrypts encrypted data, the difficulty will increase latencies for users with limited computing capability, and power consumptions will increase. Thus, there is a need for a system and a method for encrypting and/or decrypting data more efficiently and safely in the cluster organization information network and mobile cloud.

SUMMARY

In an aspect of the present disclosure, a method for data transmission in a cluster organization information network may be provided. The method may include generating one or more system parameters and a master key according to an initialization function using a security parameter relating to a cluster and a depth of the maximum of a unit vector, the cluster including a first member and a second member; generating a private key of the first member based on the one or more system parameters, the master key, and an identification vector of the first member; generating a private key of the second member based on the one or more system parameters, the identification vector of the first member, the private key of the first member, and an identification vector of the second member; and if the first member or the second number is a recipient that receives an encrypted message from a sender, determining an initial message by decrypting the encrypted message using the one or more system parameter and the private key of the recipient.

In some embodiments, the method may further include generating a public key of a cluster head of the cluster and a private key of the cluster head, wherein the encrypted message is generated, based on the one or more system parameters, the identification vector of the recipient, and the public key of the cluster head, by the sender through encrypting the initial message, and is transmitted anonymously.

In some embodiments, the method may further include before the recipient receives the encrypted message, performing the following operations: determining an identification vector of the encrypted message using the private key of the cluster head; wherein the identification vector of the encrypted message is generated based on the encrypted message and the private key of the cluster head, determining whether the identification vector of the encrypted message is consistent with the identification vector of the recipient; in response to a determination that the identification vector of the encrypted message is consistent with the identification vector of the recipient, generating an allowance signal to allow a transmission of the encrypted message in the cluster; and in response to a determination that the identification vector of the encrypted message is not consistent with the identification vector of the recipient, generating a rejection signal to reject the transmission of the encrypted message in the cluster.

In another aspect of the present disclosure, a device for data transmission in a cluster organization information network may be provided. The device may include a first generation unit, configured to generate one or more system parameters and a master key according to an initialization function using a security parameter relating to a cluster and a depth of the maximum of a unit vector, the cluster including a first member and a second member; a second generation unit, configured to generate a private key of the first member based on the one or more system parameters, the master key, and an identification vector of the first member; a third generation unit, configured to generate a private key of the second member based on the one or more system parameters, the identification vector of the first member, the private key of the first member, and an identification vector of the second member; and a decryption unit, configured to decrypt an encrypted message to generate an initial message using the one or more system parameter and the private key of a recipient, the recipient including the first member or the second number receiving the encrypted message from a sender.

In some embodiments, the device may further include a fourth generation unit, configured to generate, based on the security parameter, a public key of a cluster head of the cluster and a private key of the cluster head, wherein the encrypted message is generated by the sender through encrypting the initial message based on the one or more system parameters, the identification vector of the recipient, and the public key of the cluster head, and the encrypted message is anonymously transmitted.

In some embodiments, the device may further include an obtaining unit, configured to determine an identification vector of the encrypted message, using the private key of the cluster; a verification unit, configured to determine whether the identification vector of the encrypted message is consistent with the identification vector of the recipient; and a processing unit, configured to generate an allowance signal to allow a transmission of the encrypted message in the cluster in response to a determination that the identification vector of the encrypted message is consistent with the identification vector of the recipient, and generate a rejection signal to reject the transmission of the encrypted message in the cluster in response to a determination that the identification vector of the encrypted message is not consistent with the identification vector of the recipient.

In a further aspect of the present disclosure, a server for cluster management may be provided. The server may include a device for data transmission in a cluster organization information network as any one of claims 4-6.

In a further aspect of the present disclosure, a computing device may be provided. The computing device may include a processor, configured to implement operations for data transmission in a cluster organization information network as claimed in any one of claims 1-3 when executing a computer program stored in a storage device.

In a further aspect of the present disclosure, a computer readable medium may be provided. The computer readable medium may embody a set of computer instructions, wherein when executed by a processor, the set of computer instructions directs the processor to implement operations for data transmission in a cluster organization information network as claimed in any one of claims 1-3.

In a further aspect of the present disclosure, a method may be provided. The method may be implemented on a computing device having at least one processor and at least one computer-readable storage medium for decrypting an encrypted message in a cluster, the method comprising: generating, by a first private key generator, one or more system parameters and a master key using a security parameter of the cluster and a depth of the maximum of a unit vector, the cluster including a first member and a second member; generating, by the first private key generator, a private key of the first member based on the one or more system parameters, the master key, and an identification vector of the first member; generating, by a second private key generator, a private key of the second member based on the one or more system parameters, the identification vector of the first member, the private key of the first member, and an identification vector of the second member; and decrypting the encrypted message using the one or more system parameter and the private key of the first member or the second member.

In some embodiments, the first private key generator is independent from the second private key generator.

In some embodiments, the first member is a superior, and the second member is a subordinate.

In some embodiments, the method may further include generating a public key and a private key for a cluster head of the cluster, wherein the encrypted message is generated by encrypting the initial message based on the one or more system parameters, the identification vector of the first member or the second member, and the public key of the cluster head.

In a further aspect of the present disclosure, a system for decrypting an encrypted message in a cluster may be provided. The system may include at least one storage medium storing a set of instructions; and at least one processor configured to communicate with the at least one storage medium, wherein when executing the set of instructions, the at least one processor is directed to: generate, by a first private key generator, one or more system parameters and a master key using a security parameter of the cluster and a depth of the maximum of a unit vector, the cluster including a first member and a second member; generate, by the first private key generator, a private key of the first member based on the one or more system parameters, the master key, and an identification vector of the first member; generate, by a second private key generator, a private key of the second member based on the one or more system parameters, the identification vector of the first member, the private key of the first member, and an identification vector of the second member; and decrypt the encrypted message using the one or more system parameter and the private key of the first member or the second member.

In a further aspect of the present disclosure, a method for a fine-grained mobile access encryption may be provided.

The method may include generating one or more public key parameters pp and a master key msk based on a system security parameter $\lambda$; obtaining an identity attribute of a user; generating a private key $sk_I$ of the user based on the identity attribute and the master key msk; encrypting offline data to generate a session key key1 of the offline data and a proxy cipher text ict of the offline data; and encrypting online data to generate a session key key2 of the online data and a proxy cipher text ct of the online data.

In some embodiments, the generating the one or more public key parameters pp and the master key msk based on a system security parameter $\lambda$ comprises: determining a prime P and bilinear groups by a private key generator (PKG) based on the system security parameter $\lambda$; determining a revocation identity domain u and a validation domain v; selecting a Hash function UCH and an auxiliary parameter domain R through the PKG; selecting random numbers g and h and random exponents $\alpha$ and b from the bilinear groups through the PKG; and generating the one or more public key parameters pp and the master key msk, wherein $$u = \left[0, \frac{p-1}{2}\right], v = \left[\frac{p+1}{2}, p-1\right],$$

$\alpha, b \in Z_p$, pp=(g, $g^b$, $g^{b^2}$, $h^b$, $e(g,g)^\alpha$, UCH, R), and msk=($\alpha$, b).

In some embodiments, the determining the prime p and the bilinear groups by the PKG based on the system security parameter $\lambda$ comprises: determining the prime p by the PKG based on the system security parameter $\lambda$; determining a first group G and a second group $G_T$ based on the system security parameter $\lambda$; and mapping one or more elements in the first group G to the second group $G_T$ using a mapping function e to determine the bilinear groups.

In some embodiments, the generating the private key $sk_I$ of the user based on the identity attribute and the master key msk comprises: selecting a random exponent t through the PKG; obtaining the identity attribute of the user; and generating the private key $sk_I$ of the user based on the random exponent t, the identity attribute, and the master key msk, wherein $sk_I=(d_0, d_1, d_2)=(g^\alpha, g^{b^2t}, (g^{b\cdot I}h)^t, g^{-t})$, $t \in Z_p$, I denotes the identity attribute of the user.

In some embodiments, the encrypting the offline data to generate the session key key1 of the offline data and the proxy cipher text ict of the offline data may include: randomly selecting a first revocation set $S_{ori}=\{I_{ori,1}, \ldots, I_{ori,n}\}$; obtaining a Hash function pair (chk, td); selecting a random number r'; determining a dynamic authentication $I_v$; selecting a random number s and random exponents $s_i$ and $s_v$; determining cipher texts $C_0=g^s$, $C_{i,1}=g^{bs_i}$, $C_{i,2}=(g^{b^2 I_i}h^b)^{s_i}$, $C_{v,1}=g^{bs_v}$, and $C_{v,2}=(g^{b^2 I_v}h^b)^{s_v}$; and determining the session key key1 of the offline data and the proxy cipher text ict of the offline data, wherein, n denotes the number of revoked users $I_i \in u$, $i \in [n]$, $n=|S_{ori}|$, $I_v=$UCHash(chk, $I_{ori,1}\|\ldots\|I_{ori,n}$, r'), $s \in Z_p$, $s_i \in Z_p$, $s_v \in Z_p$, key1=$e(g,g)^{\alpha s}$, and ict=(key1, $C_0$, $(C_{i,1}, C_{i,2})_{i \in [n]}$, $C_{v,1}$, $C_{v,2}$, $S_{ori}$, $I_v$, $(s_i)_{i \in [n]}$, $s_v$, s, chk, td, r').

In some embodiments, the encrypting online data to generate the session key key2 of the online data and the proxy cipher text ct of the online data mau include: obtaining a second revocation set $S=\{I_1, \ldots, I_{|S|}\}$; determining $I_{mall,i}=(I_i-I_{ori,i})\cdot s_i$, determining a cipher text r; and determining the session key key2 of the online data and the proxy cipher text ct of the online data, wherein $i \in [|S|]$, r= UColl(td, $I_{ori,1}\|\ldots\|I_{ori,|S|}$, r', X), $X=C_0\|\{C_{i,1}\|C_{i,2}\}_{i \in [|S|]}$ $\|C_{v,1}\|C_{v,2}\|\{I_{mall,i}\}_{i \in [|S|]}$, key2=$e(g,g)^{\alpha s}$, and ct=($C_0$, $(C_{i,1}, C_{i,2})_{i \in [|S|]}$, $C_{v,1}$, $C_{v,2}$, $\{I_{mall,i}\}_{i \in [|S|]}$, chk, r).

In a further aspect of the present disclosure, a method for a fine-grained mobile access decryption may be provided. The method may include verifying an identity attribute of a user; generating a session key key based on the identity attribute; and decrypting a proxy cipher text ict of offline data and a proxy cipher text ct of online data based on a public key parameter pp, a private key $sk_I$ of the user, and the session key key.

In some embodiments, the public key parameter pp=(g, $g^b$, $g^{b^2}$, $h^b$, $e(g,g)^\alpha$, UCH, R), g and h are random numbers, $\alpha$ and b random exponents, e denotes a mapping function, UCH denotes a Hash function, R denotes an auxiliary parameter domain, the private key $sk_I=(d_0, d_1, d_2)=(g^\alpha, g^{b^2 t}, (g^{b\cdot I}h)^t, g^{-t})$, I denotes the identity attribute, t denotes a random exponent, the proxy cipher text of the offline data ict=(key1, $C_0$, $(C_{i,1}, C_{i,2})_{i \in [n]}$, $C_{v,1}$, $C_{v,2}$, $S_{ori}$, $I_v$, $(s_i)_{i \in [n]}$, $s_v$, s, chk, td, r'), key1=$e(g,g)^{\alpha s}$, $C_0=g^s$, $C_{i,1}=g^{bs_i}$, $C_{i,2}=(g^{b^2 I_i}h^b)^{s_i}$, $C_{v,1}=g^{bs_v}$, $C_{v,2}=(g^{b^2 I_v}h^b)^{s_v}$, $S_{ori}=\{I_{ori,1}, \ldots, I_{ori,n}\}$ denotes a first revocation set, $I_v=$UCHash(chk, $I_{ori,1}\|\ldots\|I_{ori,n}$, r') denotes dynamic authentication, $s \in Z_p$, $s_i \in Z_p$, $s_v \in Z_p$, (chk, td) denotes a Hash function pair, r' is a random number, v denotes a validation domain, n denotes the number of revoked users, $I_i \in u$, $i \in [n]$, $n=|S_{ori}|$, and the proxy cipher text of the online data ct=($C_0$, $(C_{i,1}, C_{i,2})_{i \in [|S|]}$, $C_{v,1}$, $C_{v,2}$, $\{I_{mall,i}\}_{i \in [|S|]}$, chk, r), S denotes a second revocation sets, $S=\{I_1, \ldots, I_{|S|}\}$, r denotes a cipher text, r=UColl(td, $I_{ori,1}\|\ldots\|I_{ori,|S|}$, r', X), $I_{mall,i}=(I_i-I_{ori,i})\cdot s_i$, and $X=C_0\|\{C_{i,1}\|C_{i,2}\}_{i \in [|S|]}\|C_{v,1}\|C_{v,2}\|\{I_{mall,i}\}_{i \in [|S|]}$.

In some embodiments, the verifying an identity attribute of a user and generating a session key key based on the identity attribute includes: authenticating the dynamic authentication $I_v$; designating $C_{i,2}=C_{i,2}\cdot(g^{b^2})^{I_{mall,i}}$; selecting a random number $\tau_i$; verifying whether a first equation and a second equation hold; if either the first equation or the second equation does not hold, determining the session key key as none, and if the first equation and the second equation both hold, outputting the session key key, wherein the first equation is $$e\left(g, C_{v,1} \times \prod_{i=1}^{|S|} C_{i,1}\right) = e(C_0, g^b),$$

the second equation is $$\frac{e\left(g^b, C_{v,2}^{\tau_0} \times \prod_{i=1}^{|S|} C_{v,2}^{\tau_i}\right)}{e\left(C_{v,1}^{\tau_0 I_v} \times \prod_{i=1}^{|S|} C_{i,1}^{\tau_i I_i}, g^{b^2}\right) \times e\left(C_{v,1}^{\tau_0} \times \prod_{i=1}^{|S|} C_{i,1}^{\tau_i}, h^b\right)} = 1,$$

the dynamic authentication is $I_v=$UCHash(chk, X, r), $i \in [|S|]$, $X=C_0\|\{C_{i,1}\|C_{i,2}\}_{i \in [|S|]}\|C_{v,1}\|C_{v,2}\{I_{mall,i}\}_{i \in [|S|]}$, $\tau_i \in [0, 2^\tau]$, $\tau \in N$, and the session key is $$\text{key} = \frac{e(C_0, d_0)}{e\left(d_1, C_{v,1}^{1/(I-I_v)} \prod_{i=1}^{|S|} C_{i,1}^{1/(I-I_i)}\right)} \cdot \frac{1}{e\left(d_2, C_{v,2}^{1/(I-I_v)} \cdot \prod_{i=1}^{|S|} C_{i,2}^{1/(I-I_i)}\right)}.$$

In a further aspect of the present disclosure, a computing device may be provided. The computing device may include a storage device, a processor, and a set of computer instructions stored in the storage device, wherein when executed by a processor, the set of computer instructions directs the processor to implement operations for encryption relating to a fine-grained mobile access as claimed in any one of claims 15-20 or decryption relating to a fine-grained mobile access as claimed in any one of claims 21-23.

In an further aspect of the present disclosure, a computer readable medium may be provided. The computer readable medium may contain a set of computer instructions, wherein when executed by a processor, the set of computer instructions directs the processor to implement operations for encryption relating to a fine-grained mobile access as claimed in any one of claims 15-20 or decryption relating to a fine-grained mobile access as claimed in any one of claims 21-23.

In still a further aspect of the present disclosure, a fine-grained mobile access encryption system may be provided. The fine-grained mobile access encryption system may include an initialization module configured to generate one or more public key parameters pp and a master key msk based on a system security parameter $\lambda$; a private key generation module configured to: obtain an identity attribute of a user; and generate a private key $sk_f$ of the user based on the identity attribute and the master key; an offline data encryption module configured to encrypt offline data to generate a session key key1 of the offline data and a proxy cipher text ict of the offline data; and an online data encryption module configured to encrypt online data to generate a session key key2 of the online data and a proxy cipher text ct of the online data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6 is a flowchart illustrating an exemplary method for data transmission in a cluster organization information network according to some embodiments of the present disclosure;

FIG. 9 is a schematic diagram illustrating an exemplary method for a fine-grained mobile access encryption according to some embodiments of the present disclosure;

DETAILED DESCRIPTION

Figure 1:
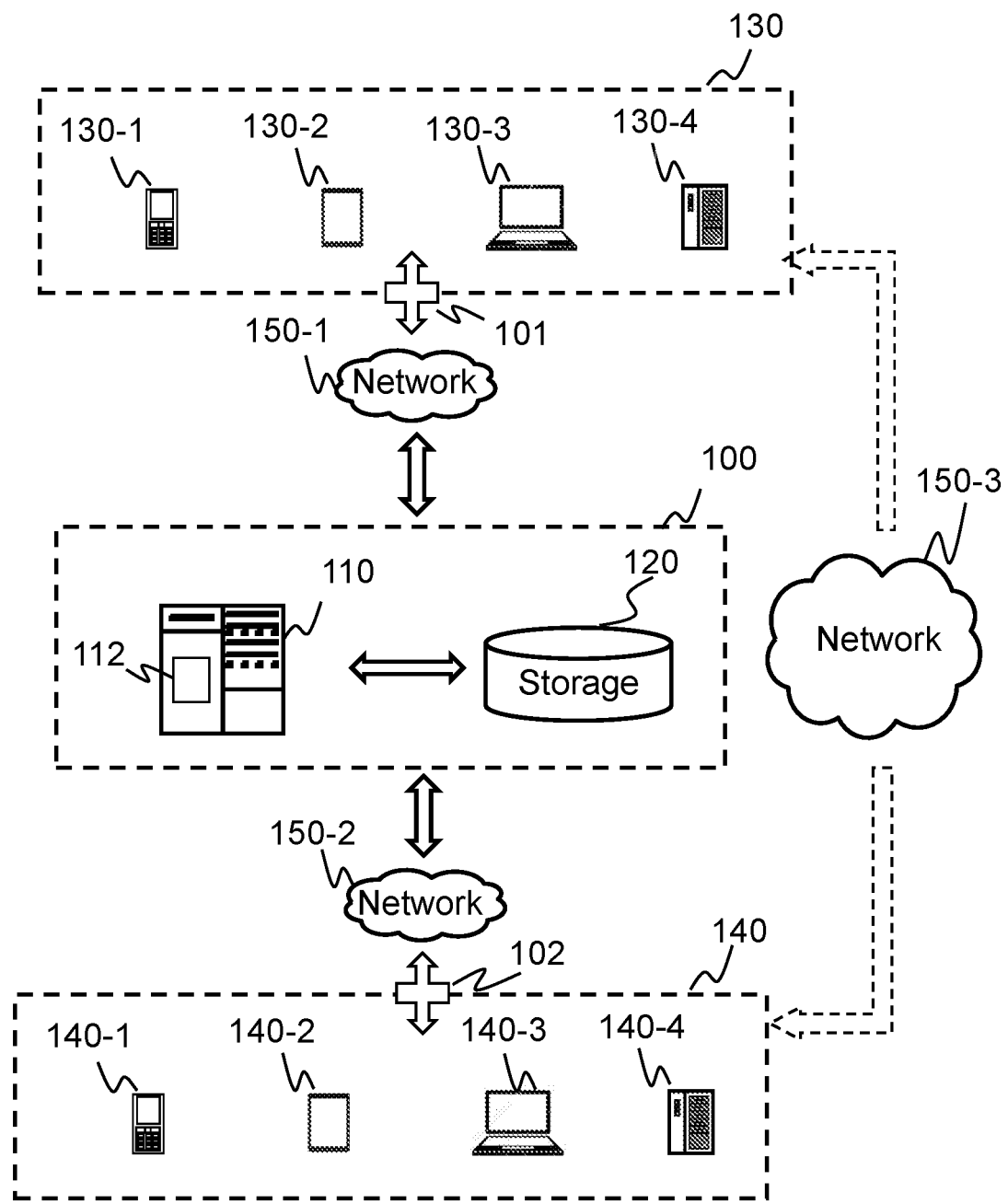
FIG. 1 is a schematic diagram illustrating an exemplary data transmission system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for data transmission in a cluster organization information network. The system may generate private keys for members of different levels using different private key generators (PKGs). A private key for a member of a second level may be generated based on private keys and/or identity information of members of a first level.

FIG. 1 is a schematic diagram illustrating an exemplary data transmission system according to some embodiments of the present disclosure. The data transmission system 100 may be a platform for data transmission and/or processing, for example, encrypting data and/or decrypting data. The data transmission system 100 may include a data exchange port 101, a data transmitting port 102, a server 110, and a storage device 120. The server 110 may include a processing engine 112. In some embodiments, the data transmission system 100 may interact with a data providing system 130 and a data allocating system 140 via the data exchange port 101 and the data transmitting port 102, respectively. For example, data transmission system 100 may access information and/or data stored in the data providing system 130 via the data exchange port 101. As another example, the server 110 may send processed information and/or data to the data allocating system 140 via the data transmitting port 102.

The server 110 may process information and/or data. For example, the server 110 may receive data (e.g., messages) from the data providing system 100, and encrypt/decrypt the received data. In some embodiments, the server 110 may be a single server, or a server group. The server group may be centralized, or distributed (e.g., the server 110 may be a distributed system). In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may encrypt and/or decrypt data according to one or more algorithms or mathematic models. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage device 120 may store data and/or instructions related to data encryption and/or data decryption. In some embodiments, the storage device 120 may store data obtained/acquired from the data providing system 130 and/or the data allocating system 140. In some embodiments, the storage device 120 may store data and/or instructions that the server 110 may execute or use to perform exemplary methods described in the present disclosure. In some embodiments, the storage device 120 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to or communicate with the server 110. The server 110 may access data or instructions stored in the storage device 120 directly or via a network. In some embodiments, the storage device 120 may be a part of the server 110.

The data providing system 130 may provide data and/or information. The data and/or information may include text, images, files, voice segments, web pages, video recordings, user requests, programs, applications, algorithms, instructions, computer codes, or the like, or a combination thereof. In some embodiments, the data providing system 130 may provide the data and/or information to the server 110 and/or the storage device 120 of the data transmission system 100 for processing (e.g., encrypting or decrypting). In some embodiments, the data providing system 130 may provide the data and/or information to the data allocating system 140 for transmitting encrypted data or decrypted data to a user.

In some embodiments, the data allocating system 140 may facilitate data transmission. The data allocating system 140 may generate responses to requests for, for example, data encryption or decryption over a network (e.g., a cluster organization information network or a mobile cloud network).

In some embodiments, the data providing system 130 and/or the data allocating system 140 may be a device, a platform, or other entity interacting with the data transmission system 100. In some embodiments, the data providing system 130 may be implemented in a device with data acquisition and/or data storage, such as a mobile device 130-1, a tablet computer 130-2, a laptop computer 130-3, and a server 130-4, a storage device (not shown), or the like, or any combination thereof. In some embodiments, the data allocating system 140 may also be implemented in a device with data processing, such as a mobile device 140-1, a tablet computer 140-2, a laptop computer 140-3, and a server 140-4, or the like, or any combination thereof. In some embodiments, the mobile devices 130-1 and 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the servers 130-4 and 140-4 may include a database server, a file server, a mail server, a web server, an application server, a computing server, a media server, a communication server, etc.

In some embodiments, any two systems of the data transmission system 100, the data providing system 130, and the data allocating system 140 may be integrated into a device or a platform. For example, both the data providing system 130 and the data allocating system 140 may be implemented in a mobile device of a user. In some embodiments, the data transmission system 100, the data providing system 130, and the data allocating system 140 may be integrated into a device or a platform. For example, the data transmission system 100, the data providing system 130, and the data allocating system 140 may be implemented in a computing device including a server and a user interface.

Networks 150-1 through 150-3 may facilitate exchange of information and/or data. In some embodiments, one or more components in the data transmission system 100 (e.g., the server 110 and/or the storage device 130) may send and/or receive information and/or data to/from the data providing system 130 and/or the data allocating system 140 via the networks 150-1 through 150-3. In some embodiments, the networks 150-1 through 150-3 may be any type of wired or wireless networks, or combination thereof. Merely by way of example, the networks 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, an ultra wide band (UWB) network, an infrared ray, or the like, or any combination thereof.

Figure 2:
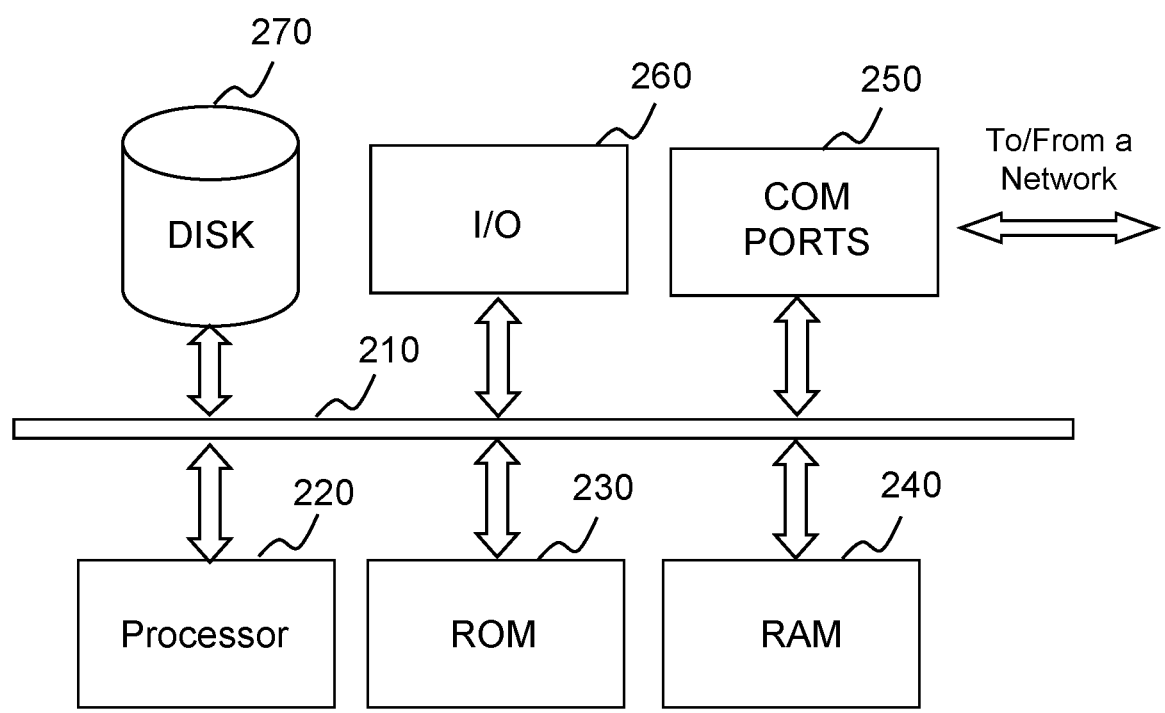
FIG. 2 is a schematic diagram illustrating exemplary components of a computing device according to some embodiments of the present disclosure.

FIG. 2 is a schematic diagram illustrating exemplary components of a computing device according to some embodiments of the present disclosure. The server 110, the data providing system 130, the storage 120, and/or the data allocating system 140 may be implemented on the computing device 200 according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the data transmission system 100 as described herein. In FIGS. 1-2, only one such computer device is shown purely for convenience purposes. One of ordinary skill in the art would understood at the time of filing of this application that the computer functions relating to the service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one processor and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
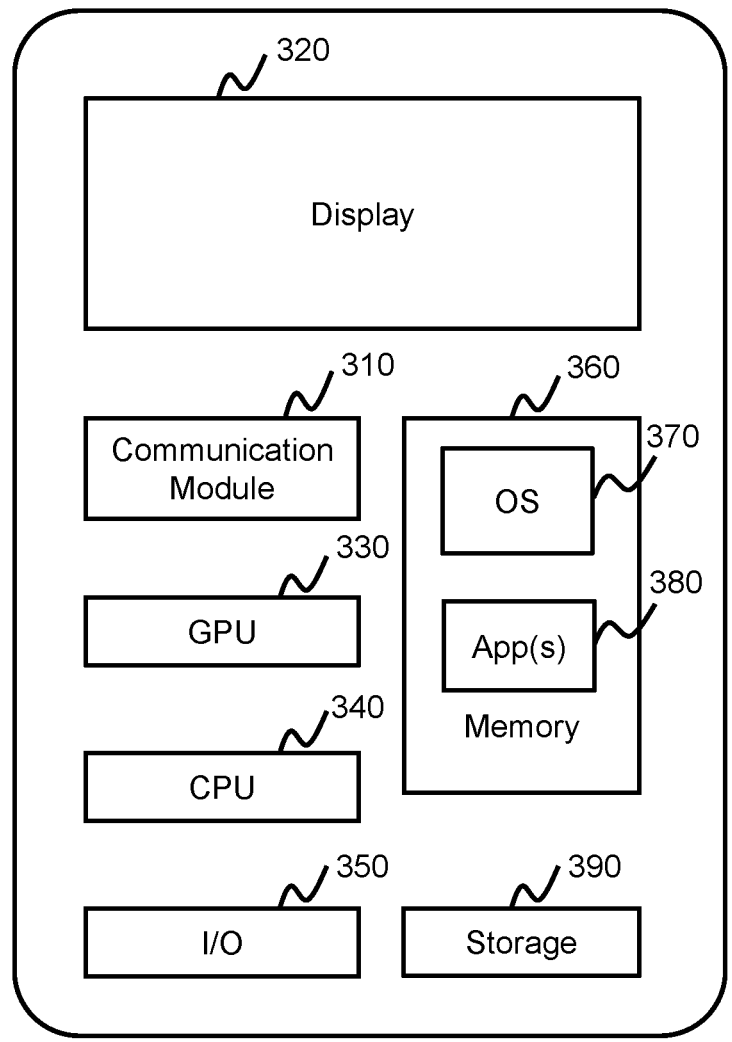
FIG. 3 is a schematic diagram illustrating exemplary hardware and/or software components of an exemplary user terminal according to some embodiments of the present disclosure.

FIG. 3 is a block diagram illustrating exemplary hardware and/or software components of an exemplary requestor terminal according to some embodiments of the present disclosure. The data providing system 130 or the data allocating system 140 may be implemented on the mobile device 300 according to some embodiments of the present disclosure. As illustrated in FIG. 3, the mobile device 300 may include a communication module 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the AI content identification system on the mobile device 300. User interactions with the information stream may be achieved via the I/O devices 350 and provided to the processing engine 112 and/or other components of the data transmission system 100 via the networks 150-1 through 150-3.

In order to implement various modules, units and their functions described above, a computer hardware platform may be used as hardware platforms of one or more elements (e.g., a component of the sever 110 described in FIG. 1). Since these hardware elements, operating systems, and program languages are common, it may be assumed that persons skilled in the art may be familiar with these techniques and they may be able to provide information required in the data classification according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4A:
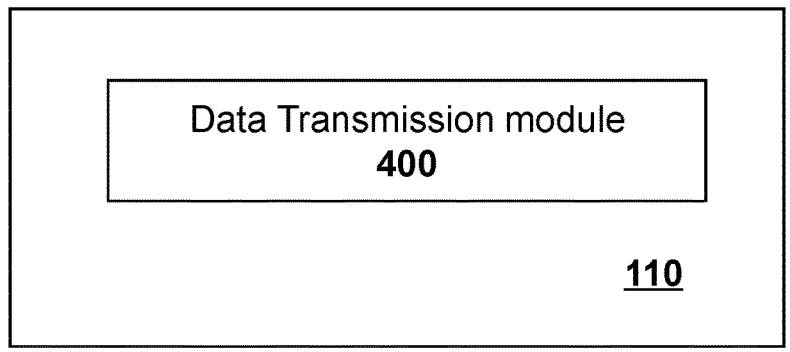
FIG. 4A is a block diagram illustrating an exemplary server for cluster management according to some embodiments of the present disclosure.

FIG. 4A is a block diagram illustrating an exemplary server for cluster management according to some embodiments of the present disclosure.

In some embodiments, the server 110 or the processing engine 112 of the server 110 may include a cluster management module 400 and a fine-gained mobile access module 700 (not shown in the figure). In some embodiments, the server 110 may be configured to perform exemplary operations as described in FIG. 1. In some embodiments, the operations that the server 110 performs may at least include the operations that the cluster management module 400 performs for data transmission in the cluster organization information network. Detailed descriptions regarding the cluster management module 400 may be disclosed elsewhere in the present disclosure, for example, FIG. 4B and the descriptions thereof.

Figure 4B:
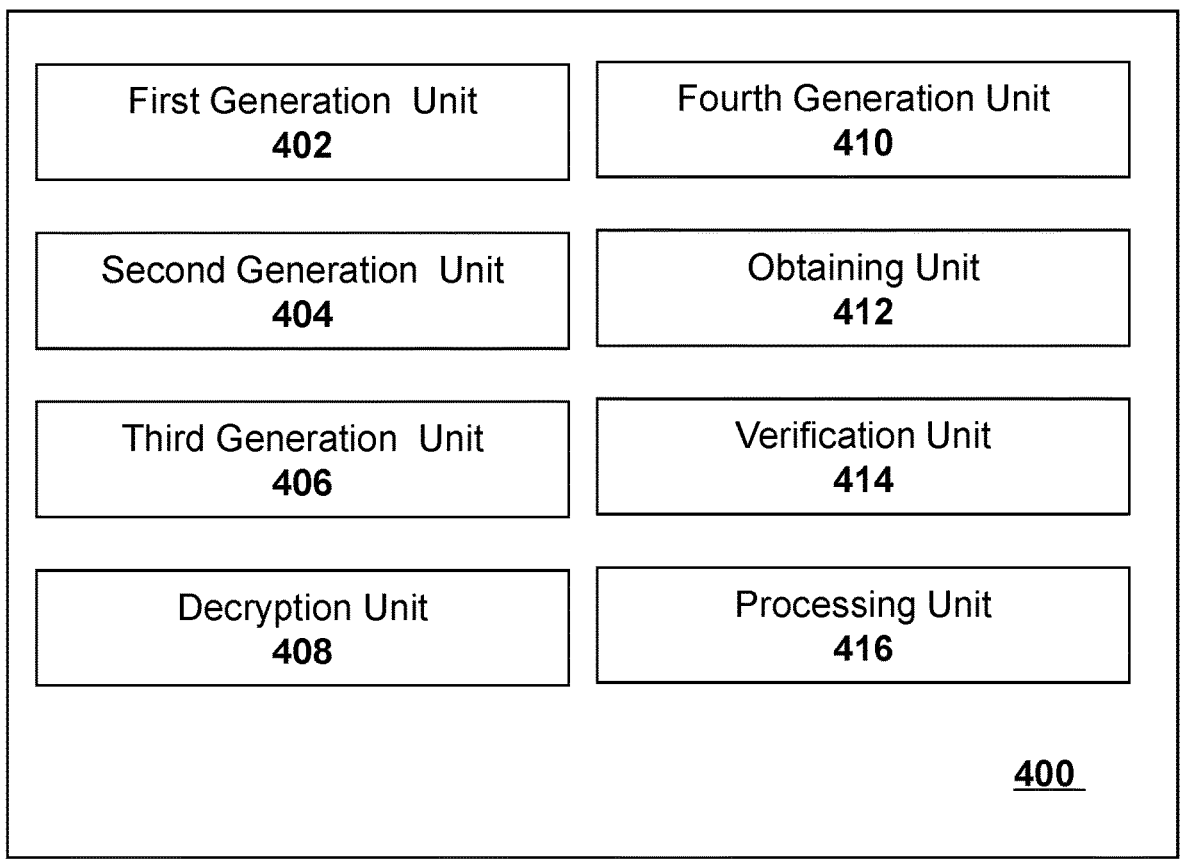
FIG. 4B is a block diagram illustrating an exemplary cluster management module 400 according to some embodiments of the present disclosure.

FIG. 4B is a block diagram illustrating an exemplary cluster management module 400 according to some embodiments of the present disclosure. As shown in FIG. 4B, the cluster management module 400 may include a first generation unit 402, a second generation unit 404, a third generation unit 406, and a decryption unit 408. The modules and/or units may be hardware circuits of at least part of the processing engine 112. The modules and/or units may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions.

The first generation unit 402 may be configured to generate, according to an initialization function, a system parameter and a master key of a cluster using a security parameter of the cluster and a depth of the maximum of a unit vector. In some embodiments, the cluster may be a group including a plurality of members. The plurality members in the cluster may be classified into one or more portions. For example, in a company cluster, a terminal of an administrator may be a first member, and a terminal of a staff may be a second member. In some embodiments, the cluster may include at least one first member and at least one second member.

The second generation unit 404 may be configured to generate a private key of each of the at least one first member based on the one or system parameter, the master key, and an identification vector of each of the at least one first member. As used herein, the identification vector of each of the at least one first member refers to a vector including identity information of one or more first members of the at least one first member. In some embodiments, the identity information of a first member may be represented by a value. The value may be determined based on, for example, a user account of the first member, an email address of the first member, etc. In some embodiments, the second generation module 404 may be or include a private key generator (PKG) for generating private keys of members in a cluster.

The third generation unit 406 may be configured to generate a private key of the each of at least one second member based on the system parameter, the identification vector of the at least one first member, at least one private key of the at least one first member, and an identification vector of each of the at least one second member. The third generation module 406 may be or include a PKG, a device, or a mechanism capable of generating private keys for a member in a cluster. In some embodiments, the PKG for generating the private key for each of the at least one second member (also referred to as a second PKG) may be different from the PKG for generating the private key for each of the at least one first member and/or the system parameters and the master key (also referred to as a first PKG). In some embodiments, the first PKG and the second PKG may be independent of each other.

In some embodiments, the identification vector of the at least one first member refers to a vector determined based on identify information of all of the at least one first member in the cluster. In some embodiments, the identification vector of each of the at least one second member refers to a vector including identity information of one or more second members of the at least one second member. In some embodiments, the identity information of a second member may be represented by a value. The value may be determined based on, for example, a user account of the second member, an email address of the second member, a telephone number of the second member, etc.

The decryption unit 408 may be configured to decrypt an encrypted message to obtain an initial message to be transmitted using the system parameter and a private key of a recipient. The recipient may include a first member or a second number. The recipient may receive the encrypted message from a sender. In some embodiments, the decryption unit 408 may be implemented on a terminal device of the recipient.

In some embodiments, as shown in FIG. 4A, the cluster management module 400 may further include a fourth generation unit 410. The fourth generation module 410 may be configured to generate a public key of a cluster head of the cluster and a private key of the cluster head. In some embodiments, the encrypted message is generated, in a terminal device of a sender, by encrypting the initial message based on the system parameter, the identification vector of the recipient, and the public key of the cluster head, and the encrypted message is anonymously transmitted.

In some embodiments, the cluster management module 400 may further include an obtaining unit 412, a verification unit 414, and a processing unit 416.

The obtaining unit 412 may be configured to determine an identification vector relating to the encrypted message. In some embodiments, the identification vector relating to the encrypted message may be generated based on the encrypted message and the private key of the cluster head.

The verification unit 414 may be configured to determine whether the identification vector relating to the encrypted message is consistent with the identification vector of the recipient. In some embodiments, the cluster management module 400 may verify the semantic security and anonymity of the transmission of the encrypted message in the cluster organization information network.

The processing unit 416 may generate a signal for allowing or rejecting the transmission of the encrypted message in the cluster. In some embodiments, the processing unit 416 may generate a signal for allowing the transmission of the encrypted message in the cluster in response to a determination that the identification vector relating to the encrypted message is consistent with the identification vector of the recipient. In some embodiments, the processing unit 416 may generate a signal for rejecting the transmission of the encrypted message in the cluster in response to a determination that the identification vector relating to the encrypted message is not consistent with the identification vector of the recipient.

Merely for illustration purposes, the cluster management module 400 may include an initialization sub-module (equivalent to the first generation unit 402), a CH key generation sub-module (equivalent to the fourth generation unit 410), a first member private key generation sub-module (equivalent to the second generation unit 404), a second member private key generate sub-module (equivalent to the third generation unit 406), a data encryption sub-module, a decryption sub-module (equivalent to the decryption unit 408), a trace sub-module and a verification protocol (equivalent to the obtaining unit 412 and the verification unit 414). In some embodiments, one or more submodules or units of the cluster management module 400 may be configured to perform one or more of the following operations.

1. The initialization sub-module may be configured to determine, through a PKG, system parameters Params and a master key MSK of a cluster (e.g., a school cluster, a company cluster, etc.) according to a polynomial algorithm by inputting a security parameter $\lambda$ and the depth of the maximum of a predetermined unit vector l into an initialization function Setup($\lambda$, l).

2. The CH key generation sub-module may be configured to determine a public key CPK and a private key CSK of the cluster head according to a polynomial algorithm by inputting one of the security parameter $\lambda$ and Setup($\lambda$, l) into a key generation function CHkeyGen ( ).

3. The first member private key generation sub-module may be configured to determine, through the PKG, a private key $USK_j$ of each of at least one first member in the cluster according to a polynomial algorithm by inputting the system parameters Params, the master key MSK, and a identification vector $\vec{ID}_j$ (equivalent to $(ID_1, \ldots, ID_j)$, j≤l) of each of the at least one first member (e.g., a teacher in a school cluster) into a private key generation function USkeyGen (Params, MSK, $\vec{ID}_j$).

4. The second member private key generate sub-module may be configured to determine, through another PKG or a device for generating a private key for a member in a cluster, a private key $USK_{j+1}$ of a second member $ID_{j+1}$ according to a polynomial algorithm by inputting the system parameters Params, an identification vector $\vec{ID}_j$ of all members of the at least one first member, the identification vector $ID_{j+1}$ (wherein j+1≤l) of the second member, and at least one private key $USK_j$ of the at least one first member into a key distribution function Deletegate (Params, $\vec{ID}_j$, $ID_{j+1}$, $USK_j$).

5. The data encryption sub-module may be configured to generate cipher texts C (i.e., encrypted message to be transmitted in the cluster) according to a polynomial algorithm by inputting the system parameters Params, the identification vector $\vec{ID}_j$ of the recipient (i.e., a receiver of the encrypted message), the public key CPK of the cluster head, and the encrypted message M into the encryption function Encrypt (Params, $\vec{ID}_j$, CPK, M). In some embodiments, the data encryption sub-module may be implemented on a terminal of a sender of the encrypted message.

6. The decryption sub-module may be configured decrypt the message M according to a polynomial algorithm by inputting the system parameters Params, the private key $USK_j$ of the recipient, and the cipher texts C into a decryption function Decrypt (Params, C, $USK_j$). In some embodiments, the decryption sub-module may be implemented on a terminal device of a recipient of the message M.

7. The trace sub-module may be configured to determine $\vec{ID}$ for generating cipher texts according to a polynomial algorithm by inputting the cipher texts C and the private key CSK of the CH into a trace function Trace (C, CSK).

A protocol Verify(C) may be constructed to prove that the identification vector $\vec{ID}$ used to generate the cipher texts is consistent with $\vec{ID}$ in the cipher texts. The protocol Verify(C) may be referred to as a zero-knowledge interaction protocol, which indicates that a user (e.g., a prover) may verify the consistency of $\vec{ID}$ interactively. If the identification vector $\vec{ID}$ used to generate the cipher texts is consistent with $\vec{ID}$ in the cipher texts, a verifier may output a prompt message accept, and the cipher texts can be transmitted in the cluster (i.e., the sender may be allowed to send the cipher texts to a recipient). Otherwise, the sender may not be allowed to send the cipher texts to the recipient.

In summary, the one or more sub-modules may perform exemplary operations in a predetermined order, such as "initialization sub-module"→"CH key generate sub-module"→"first member private key generation sub-module"→"second member private key generate sub-module"→"data encryption sub-module"→"decryption sub-module"→"trace sub-module".

In some embodiments, the private key generator may generate a private key for a member of the cluster using an identification vector $\vec{ID}$ corresponding to the member. In some embodiments, the cluster head may manage the cluster members and trace a sender or a recipient when an illegal message is transmitted in the cluster. In some embodiments, the members may include a high-level member (also referred to as a first member) and a low-level member (also referred to as a second member), but the classification of a member may be changed. In some embodiments, all of the recipients may be members in the cluster, and the cipher texts may need to be decrypted through the private key generated by the first member or PKG. If necessary, the CH may track and find the sender of the illegal message. In some embodiments, the sender may be a member in the cluster, or may not be a member in the cluster. The sender may encrypt the message using the identification vector $\vec{ID}$ of the recipient as the public key, and the encrypted cipher texts may be anonymous. In some embodiments, the verifier may prove the consistence of the identification vector of the cipher texts and the identification vector hidden behind the cipher texts.

In some embodiments, the technical solution described in the present disclosure may be verified in the following steps. The technical solution may be verified to be correct if the verification strategy returns a true value with a larger probability.

Step 1: (Params, MSK)←Setup($\lambda$, l)

Step 2: (CPK, CSK)←CHKeyGen($\lambda$)

Step 3: $USK_j$←USKeyGen(Params, MSK, $\vec{ID_j}$)

Step 4: $USK_j$←USKeyGen(Params, MSK, $\vec{ID_j}$)

Step 5: $C_0$←Encrypt(Params, CPK, $\vec{ID_j}$, M)

$C_1$←Encrypt(Params, CPK, $\vec{ID_{j+1}}$, M)

Step 6: If all the following conditions are satisfied, the verification strategy returns a true value (true):

Decrypt($C_0$, Params, $USK_j$)=M

Decrypt($C_1$, Params, $USK_{j+1}$)=M

Verify($C_0$)=accept, Verify($C_1$)=accept

Trace($C_0$)=$\vec{ID_j}$, Trace($C_1$)=$\vec{ID_{j+1}}$

In some embodiments, the cluster management module 400 may use an enemy A and a challenger B to verify the security of the message transmission in the cluster organization information network. The security used herein refers to semantic security, anonymity, and traceability. In order to prevent cipher texts from being easily decrypted and analyzed by an enemy, and identification vector from the cipher texts is hidden, a verification for the semantic security and anonymity is necessary. In some embodiments, the cluster management module 400 may verify the semantic security and anonymity of the technical solution by performing one or more of the following steps.

Step 1, initialization: the challenger B may execute Setup, enter a security parameter $\lambda$, hold MSK secretly, and send system parameter Params to the enemy A.

Step 2, first phase: the enemy A may conduct query operations through USKeyGen, Delegate, and Trace at proper times, and obtain a private key USK of a cluster member of an identification vector $\vec{ID}$.

Step 3, first challenge: the enemy A may select two cipher texts $M_0$ and $M_1$ of a same length and two identification vectors $\vec{ID_0}$ and $\vec{ID_1}$, the cipher texts and the identification vectors may not appear in the query operations for private key in the first phase. The challenger B may select a c∈{0,1} randomly, and run the algorithm Encrypt(Params, $M_c$, $ID_c$, CPK), and transmit the output of the algorithm to the enemy A.

Step 4, second phase: second phase may be similar to the first phrase, $\vec{ID}$ may not be a prefix of $\vec{ID_0}$ or $\vec{ID_1}$, and no inquiry Trace is allowed.

Step 5, conjecture: the enemy A may output a conjecture c'={0,1}, if c'=c, A wins in this strategy.

An advantage that the enemy A wins in the strategy is defined as: $Adv_A=|Pr[c'=c]-½|$.

For the enemy A and the security parameter $\lambda$, if the advantage satisfies a condition that $Adv_A=|Pr[c'=c]-½|\le\varepsilon$, it is proved that the transmission of the message may be semantically secure and anonymous in the cluster organization information network.

In some embodiments, the CH may track a recipient if the message is illegal or controversial. However, if the enemy uses the identification vector of the recipient as the public key, and identification vectors of other members are used in the cipher texts, the CH may track a wrong target. Therefore, the traceability needs to be ensured to prevent the enemy from using identification vectors of other members in the cipher texts. Merely for illustration purposes, the traceability of the technical solution may be verified according to the following steps.

Step 1: initialization: the challenger B may enter a security parameter $\lambda$, operate Setup and CHKeyGen, and send the output Params and CSK of the Setup, CHKeyGen to a challenger A'.

Step 2: checking phase: the challenger A' may conduct query operations through CHKeyGen, USKeyGen, Delegate, Encrypt, Decrypt, and Trace, and the challenger B may answer the inquiries. In addition, the challenger A' may act as a prover to interact with a verifier when the query Verify is performed in the zero-knowledge proof system.

Step 3: output: the challenger A' may encrypt the message M and output cipher texts C', the cipher texts may be decrypted back to the message M when the query Decrypt is conducted. Finally, if a wrong identification vector of the recipient is output from Trace(C'), the enemy A' wins in the strategy.

The advantage of that the enemy A' wins in the strategy is defined as: $Adv_{A'}=Pr[Trace(Encrpt_{A'}(M, \vec{ID}))\ne\vec{ID}]$.

For the enemy A' and the security parameter $\lambda$, if the advantage of A' satisfies a condition that $Adv_{A'}=Pr[Trace(Encrpt_{A'}(M, \vec{ID}))\ne\vec{ID}]\le\varepsilon$, it is proved that the data transmission is traceable (i.e., the traceability is verified)

The zero-knowledge proof system described above may be used to ensure the cipher texts being legally generated, semantically secure, anonymous, and traceable.

It should be noted that the above description of the processing engine 112 is merely provided for the purposes of illustration, and not intended to limit the scope of the present disclosure. For persons having ordinary skills in the art, multiple variations and modifications may be made under the teachings of the present disclosure. For example, the processing engine 112 may further include a storage module facilitating data storage. However, those variations and modifications do not depart from the scope of the present disclosure.

Figure 5:
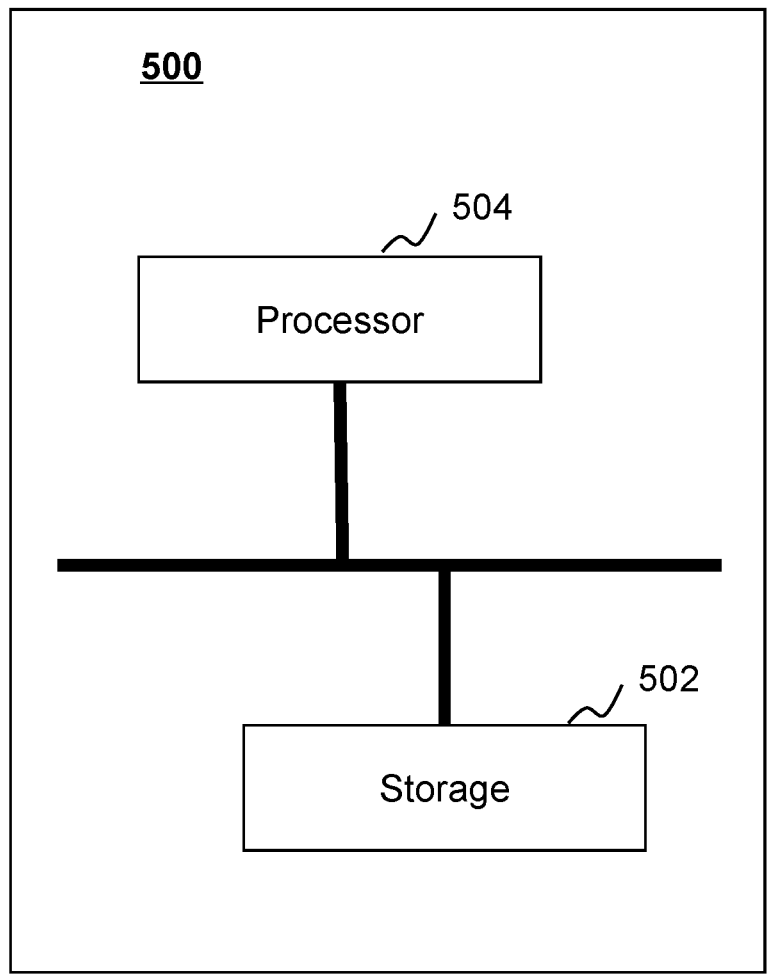
FIG. 5 is a block diagram illustrating an exemplary computing device according to some embodiments of the present disclosure.

FIG. 5 is a block diagram illustrating an exemplary computing device according to some embodiments of the present disclosure. As shown in FIG. 5, the computing device 500 may include a storage 502, a processor 504, and a set of computer instructions stored on the storage 502, which may be executed on the processor 504. The storage 502 and the processor 504 may be connected through a system bus, and the processor 504 may be configured to execute the set of computer instructions stored on the storage 502 to implement operations for data transmission in a cluster organization information network according to the following embodiments.

Steps in the embodiments of the present disclosure may be reordered, merged, or deleted according to actual requirements.

Devices and/or units in the present disclosure may be combined, divided, or deleted according to actual requirements.

A computer readable medium embodying a set of computer instructions may be provided according to some embodiments of the present disclosure, wherein when executed by a processor, the set of computer instructions may direct the processor to implement operations for data transmission in a cluster organization information network according to the following embodiments.

Further, it will be appreciated by those skilled in the art, all of the steps or a portion of the steps in various methods of the following embodiments may be implemented by a relevant hardware directed by computer instructions. The computer instructions may be stored in a computer readable storage medium. The storage medium include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM), a compact disc read-only memory, (CD-ROM) or an optical disk, a magnetic disk, a magnetic tape, or any other computer readable medium may be used to carry or store data. Further, the computing device may be a PC (Personal Computer) terminal.

FIG. 6 is a flowchart illustrating an exemplary method for data transmission in a cluster organization information network according to some embodiments of the present disclosure. In some embodiments, the process 600 may be implemented in the data transmission system 100. For example, the process 600 may be stored in the storage 120 and/or the storage (e.g., a ROM, a RAM, etc.) as a form of instructions, and invoked and/or executed by the server 110 (e.g., the processing engine 112 in the server 110, or the processor 752 of the processing engine 112 in the server 110).

In 602, one or more system parameters and a master key may be generated according to an initialization function using a security parameter relating to a cluster and a depth of the maximum of a unit vector, the cluster including at least one first member and at least one second member. In some embodiments, the system parameters and a master key may be generated by the first generation module 402. In some embodiments, the first generation module 402 may be or include a private key generator (PKG). In some embodiments, the PKG may be implemented as one or more components (e.g., the first generation module 402 or the second generation module 404) of the data transmission system 100.

In some embodiments, the security parameter and the depth of the maximum of a unit vector may be predetermined. For example, the security parameter and the depth of the maximum of a unit vector may be by set a user, or predetermined by the data transmission system 100. As used herein, the unit vector refers to a series connection of identities of members in the cluster. The depth of the maximum of a unit vector refers to the number of members in the cluster. In some embodiments, the security parameter may be expressed as a string. The longer the security parameter and/or the depth of the maximum of a unit vector is, the higher the security of the encrypted data transmitted in the cluster organization information network will be. In some embodiments, the security parameter may be a random number. In some embodiments, the security parameter may be set according to security requirements of users. For example, if the security requirement of a user is higher, a random number of 2048-bit may be used as the security parameter. If the security requirement of a user is lower, a random number of 1024-bit may be used as the security parameter.

In some embodiments, the PKG may generate the one or more system parameters and a master key by inputting the security parameter and the depth of the maximum of a unit vector into an initialization function setup( ).

In 604, a private key for each of the at least one first member may be generated based on the system parameters, the master key, and an identification vector of each of the at least one first member. In some embodiments, the private key for each of the at least one first member may be generated by the second generation module 404. In some embodiments, the second generation module 404 may be or include a PKG. In some embodiments, the PKG for generating the private key for each of the at least one first member may be the same as the PKG for generating the system parameters and the master key in 602.

In some embodiments, the cluster may be a group including a plurality of members. The plurality members in the cluster may be classified into one or more portions. For example, in a company cluster, a terminal of an administrator may be a first member, and a terminal of a staff may be a second member. As another example, in a school cluster, a terminal of a teacher may be a first member, and a terminal of a student may be a second member. In some embodiments, the PKG may generate a private key corresponding to the level of each member in the cluster.

As used herein, the identification vector of each of the at least one first member refers to a vector including identity information of one or more first members of the at least one first member. In some embodiments, the identity information of a first member may be represented by a value. The value may be determined based on, for example, a user account of the first member, an email address of the first member, etc.

In some embodiments, the PKG may generate the private key for each of the at least one first member by inputting the one or more system parameters, the master key, and/or an identification vector of each of the at least one first member into a function USkeyGen( ). For example, the private key of a first user of the at least one first member may be determined by inputting the one or more system parameters, the master key, and an identification vector of the first user (e.g., determined based on identify information of the first user) into the function USkeyGen( ). As another example, the private key of a second user of the at least one e first member may be determined by inputting the one or more system parameters, the master key, and an identification vector of the second user (e.g., determined based on identify information of the first user and the second user) into the function USkeyGen( ).

In 606, a private key for each of the at least one second member may be generated based on the system parameters, an identification vector of the at least one first member, the private keys of the at least one first member, and an identification vector of each of the at least one second member.

In some embodiments, the private key for each of the at least one second member may be generated by the third generation module 406. The third generation module 406 may be or include a PKG, a device, or a mechanism capable of generating private keys for a member in a cluster. In some embodiments, the PKG for generating the private key for each of the at least one second member (also referred to as a second PKG) may be different from the PKG for generating the private key for each of the at least one first member and/or the system parameters and the master key (also referred to as a first PKG). In some embodiments, the first PKG and the second PKG may be independent of each other. Merely by ways of example, the first PKG may be implemented on a local processing device (e.g., the server 110), and the second PKG may be implemented on a remote processing device (e.g., a cloud server connects to the server 110 via a network).

In some embodiments, the identification vector of the at least one first member refers to a vector determined based on identify information of all of the at least one first member in the cluster. In some embodiments, the identification vector of each of the at least one second member refers to a vector including identity information of one or more second members of the at least one second member. In some embodiments, the identity information of a second member may be represented by a value. The value may be determined based on, for example, a user account of the second member, an email address of the second member, a telephone number of the second member, etc.

In some embodiments, the second PKG may generate the private key for each of the at least one second member by inputting the system parameters, the identification vector of the at least one first member, the private keys of the at least one first member, and the identification vector of each of the at least one second member into a private key allocation function Deletegate( ).

In 608, if a member of the at least one first member or the at least one second number is a recipient that receives an encrypted message from a sender, an initial message may be determined by decrypting the encrypted message using the system parameters and the private of the recipient. In some embodiments, the initial message may be determined by the decryption module 408. In some embodiments, the decryption module 408 may decrypt the encrypted message by inputting the system parameters and the private of the recipient into an decryption function Decrypt( ).

Merely for illustration purposes, in a cluster including a first member and a second member, if any member in a cluster organization information network is a recipient that receives an encrypted message from a sender, system parameters and a master key may be generated by initializing a security parameter of the cluster and a depth of the maximum of the unit vector, and a private key of a first member of the cluster may be generated by based on an identification vector of the first member, then a private key of a second member of the cluster may be generated based on the identification vector of the first member, the private key of the first member, and an identification vector of the second member, so as to determine an initial message by decrypting the encrypted message effectively. In some embodiments, the level of the first member may be higher than the level of the second member in the cluster. The second member may obtain his/her private key based on the private key of the first member, which may avoid that private keys of all members in the cluster being generated by a public key generator, thus reducing bandwidth requirements and computational loads of the public key generator as well as preventing the public key generator from bearing the loads of distributing private keys to all members in the cluster. Also, a recipient may determine an initial message by decrypting the encrypted message using the system parameters and the private of the recipient after the recipient receives the encrypted message from a sender. In addition, the security of the message to be transmitted in the cluster organization information network may be effectively ensured by implementing a hierarchical encryption scheme based on an identification vector of each member in the cluster.

In some embodiments, the identification vector of a member of the at least one first member or the at least one second member may be determined based on, for example, mail address of the member, telephone number of the member, etc.

In some embodiments, the recipient of the encrypted message may be a member in the cluster, and the sender may be a member in the cluster or not a member in the cluster.

In some embodiments, the process 600 further include generating a public key and a private key for a cluster head of the cluster based on the security parameter of the cluster. The cluster head may be an administrator of the cluster. For example, the cluster head may determine whether to accept a new member that is willing to join the cluster, track a sender of a message even though the message is anonymous, and remove malicious cluster members out of the cluster. In some embodiments, the initial message to be transmitted to a recipient in the cluster may be encrypted based on the one or more system parameters, an identification vector of the recipient, and the public key of the cluster head. In some embodiments, the initial message may be encrypted by inputting the one or more system parameters, an identification vector of the recipient, and the public key of the cluster head into an encryption function Encrypt( ).

In some embodiments, the data transmission system 100 may generate a public key and a private key for the cluster head of the cluster organization information network based on a security parameter of the cluster, then a sender of an initial message may use the public key of the cluster head, one or more system parameters of the cluster, and an identification vector of a recipient to encrypt the initial message. The encrypted message may be transmitted to the recipient anonymously for ensuring the security of the message, and the recipient may not identify an identification vector of the sender. In this process, a character string such as the identification vector of the recipient may be used as a public key to encrypt the initial message, thus enabling the sender to identify the accuracy of the public key as well as ensuring the validity of the encryption.

In some embodiments, the process 600 may further include one or more of the following operations before a recipient receives an encrypted message. Merely for illustration purposes, the data transmission system 100 may determine an identification vector relating to the encrypted message using a private key of the cluster head. The data transmission system 100 may determine whether the identification vector relating to the encrypted message is consistent with an identification vector of the recipient. If the identification vector relating to the encrypted message is consistent with the identification vector of the recipient, the data transmission system 100 may generate an allowance signal to allow a transmission of the encrypted message in the cluster. If the identification vector relating to the encrypted message is not consistent with the identification vector of the recipient, the data transmission system 100 may generate a rejection signal to reject the transmission of the encrypted message in the cluster.

In some embodiments, in order to avoid that a member of the cluster denies that he/she has received the message or he/she sent an illegal message sent to a member in the cluster (i.e., it is difficult to trace the recipient or the sender of a message effectively), an identification vector of the recipient may be used when the message is encrypted, and an unique identification vector relating to the encrypted message may be generated based on the encrypted message and the private key of the cluster head before the encrypted message is transmitted to the recipient in the cluster for transmission, thus facilitating the trace of the encrypted message by verifying whether the identification vector used in the encrypted message is consistent with the identification vector of the recipient used to generate the encrypted message. The cluster head may trace the identification vector according to the encrypted message so as to track the recipient or the sender of the message, and remove malicious members in the cluster. Specifically, a zero-knowledge interaction protocol may be used in the verification process (i.e., no information other than the identification vector may be obtained during the verification process). The zero-knowledge interaction protocol may ensure the security and the legitimacy of the encrypted message. Further, the encrypted message may be allowed to be transmitted in the cluster after the verification process, otherwise the transmission of encrypted message in the cluster may be rejected.

Figure 7A:
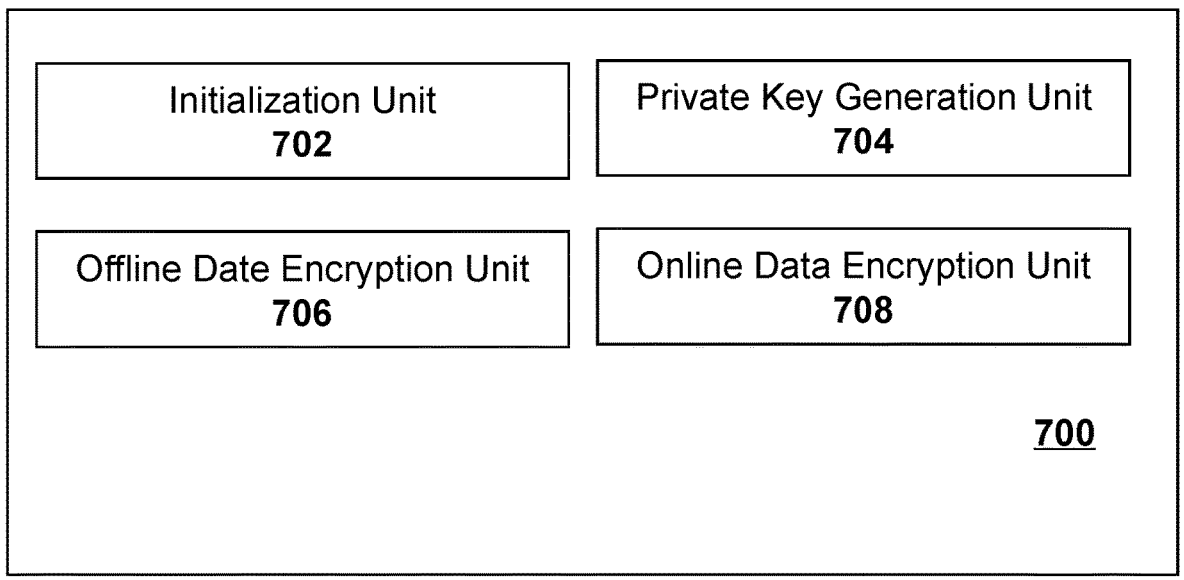
FIG. 7A is a block diagram illustrating exemplary fine-grained mobile access module of the server according to some embodiments of the present disclosure.

FIG. 7A is a block diagram illustrating exemplary fine-grained mobile access module 700 of the server 110 according to some embodiments of the present disclosure. The fine-grained mobile access module 700 may include a initialization unit 702, a private key generation unit 704, an offline data encryption unit 706, and an online data encryption unit 708. The modules and/or units may be hardware circuits of at least part of the processing engine 112. The modules and/or units may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions.

The initialization unit 702 may be configured to generate a public key parameter pp and a master key msk based on a system security parameter $\lambda$.

The private key generation unit 704 may be configured to obtain an identity attribute of a user, and generate a private key $sk_I$ of the user based on identity attribute of the user and the master key msk.

The offline data encryption unit 706 may be configured to encrypt offline data to generate a session key key1 of the offline data and a proxy cipher text ict of the offline data.

The online data encryption unit 708 may be configured to encrypt online data to generate a session key key2 of the online data and a proxy cipher text ct of the online data.

The modules of the data transmission system 100 for a fine-grained mobile access encryption may include the initialization module 502 configured to perform an initialization, and generate the public key parameter pp and the master key msk based on a system security parameter $\lambda$, the private key generation module 504 configured to obtain an identity attribute of a user, and generate a private key $sk_I$ of the user, the offline data encryption unit 706 configured to encrypt offline data to generate the session key key1 of the offline data and the proxy cipher text ict of the offline data, and the online data encryption unit 708 configured to encrypt online data to generate the session key key2 of the online data and the proxy cipher text ct of the online data. With these modules, the security of the encryption may be ensured, and the calculation time of the encryption process may be reduced simultaneously, such that the efficiency of the encryption may be improved. It should be noted that the system security parameter $\lambda$ is determined according to requirements for security. The requirements for security in any time or for any enterprise may not be the same. For example, the bit number of the system security parameter $\lambda$ may be increased when it is not safe enough with a length of 256 bits. In some embodiments, the system security parameter $\lambda$ may be a variable rather than a fixed value.

In some embodiments, the initialization unit 702 may be further configured to determine a prime p and bilinear groups by inputting the system security parameter $\lambda$ into a PKG, determine a revocation identify domain u and a validation domain v, select a Hash function UCH and an auxiliary parameter domain R through the PKG, select random numbers g and h and random exponents $\alpha$ and b from the bilinear groups, and generate the public key parameters pp and the master key msk, where the revocation identify domain $$u = \left[0, \frac{p-1}{2}\right],$$

the validation domain $$v = \left[\frac{p+1}{2}, p-1\right], \alpha \searrow b \in Z_p,$$

the public key parameter $pp=(g, g^b, g^{b^2}, h^b, e(g,g)^\alpha, UCH, R)$, the master key $msk=(\alpha,b)$.

In some embodiments, the initialization unit 702 may be configured to determine the prime p and bilinear groups by inputting the system security parameter $\lambda$ into the PKG. The revocation identity domain $$u = \left[0, \frac{p-1}{2}\right],$$

the validation domain $$v = \left[\frac{p+1}{2}, p-1\right], \alpha \searrow b \in Z_p,$$

the public key parameter $pp=(g, g^b, g^{b^2}, h^b, e(g,g)^\alpha, UCH, R)$, the master key $msk=(\alpha, b)$. The initialization unit 702 may determine the prime p (e.g., a random big prime) using the PKG based on the system security parameter $\lambda$, determine a first group G and a second group $G_T$ based on the system security parameter $\lambda$, and map an element in the first group G to the second group $G_T$ using a mapping function e to determine the bilinear groups. The initialization unit 702 may determine a revocation identity domain u and a validation domain v, select a Hash function UCH and an auxiliary parameter domain R through the PKG, determine random numbers g and h and random exponents $\alpha$ and b in the bilinear groups, and generate a public key parameter pp.

The public key parameter pp may be open to the public, and the master key msk is stored in the PKG. The revocation identity domain u defines a user's identity to revoke the right of someone within a scope. UCH: $\{0,1\}^* \to V$ indicates that a value input into the UCH has a certain number of bits composed of 0 or 1, and a value output by the UCH is v. The process for selecting the random numbers g and h and random exponents $\alpha$ and b may include determining an appropriate elliptic curve, for example, $Y^2 = X^3 + a \times X + b$, where a and b denote coefficients. The initialization unit 702 may select a value $x_1$ of the independent variable x randomly, and calculate a value $y_1$ of the dependent variable y. if a point $(x_1, y_1)$ in the first group G is mapped to the second group $G_T$ a random element may be generated. If a point in the first group G is not mapped to the second group $G_T$, the value of x may be selected sequentially until a point in the first group G is mapped to the second group $G_T$. The principle used when random numbers or random exponents are selected may be similar as what is described below in the present disclosure. The hash function UCH may be any hash function.

In some embodiments, the initialization unit 702 may be further configured to determine a prime p by inputting a system security parameter $\lambda$ into a PKG, determine a first group G and a second group $G_T$ based on the system security parameter $\lambda$, and map one or more elements in the first group G to the second group $G_T$ using a mapping function e to determine bilinear groups.

In some embodiments, the initialization unit 702 may determine the prime p through the PKG, where the prime p is a random big prime. The PKG may select, based on the system security parameter $\lambda$, the first group G and the second group $G_T$, the mapping function e to map one or more elements in the first group G to the second group $G_T$. The larger the system security parameter is, the more the points on elliptic curve will be, and the larger the cluster will be.

In some embodiments, the private key generation unit 704 may be configured to select the random exponent t through a PKG, obtain an identity attribute of a user, generate a private key $sk_I$ of the user based on the random exponent t, the identify attribute, and the master key msk where the random exponent $t \in Z_p$, I denotes the identify attribute of the use, and the private key $sk_I = (d_0, d_1, d_2) = (g^\alpha g^{b^2 t}, (g^{b \cdot I} h)^t, g^{-t})$.

In some embodiments, the private key generation unit 704 may select the random exponent t through the private key generator, obtain the identify attribute I of the user, and generate the private key $sk_I$ of the user based on the random exponent t, the identify attribute I, and the master key msk. The private key generation unit 704 may obtain the private key $sk_I$ of the user through polynomial multiplication and exponentiation based on the equation $sk_I = (d_0, d_1, d_2) = (g^\alpha g^{b^2 t}, (g^{b \cdot I} h)^t, g^{-t})$.

In some embodiments, the offline data encryption unit 706 may be further configured to select a first revocation set $S_{ori} = \{I_{ori,1}, \ldots, I_{ori,n}\}$ randomly, obtain a Hash function pair (chk, td), select a random number r', determine a dynamic authentication $I_v$, select a random number s and random exponents $s_i$ and $s_v$, determine cipher texts $C_0 = g^s$, $C_{i,1} = g^{bs_i}$, $C_{i,2} = (g^{b^2 I} h^b)^{s_i}$, $C_{v,1} = g^{bs_v}$, $C_{v,2} = (g^{b^2 I_v} h^b)^{s_v}$, and determine a session key key1 of offline data and a proxy cipher text ict of offline data, where n denotes the number of revoked users, $I_i \in u$, $i \in [n]$, $n = |S_{ori}|$, and the dynamic authentication $I_v = UCHash(chk, I_{ori,1} \| \ldots \| I_{ori,n}, r')$, $s \in Z_p$, $s_v \in Z_p$, the session key of the offline data $key1 = e(g,g)^{\alpha s}$, the proxy cipher text of the offline data $ict = (key1, C_0, (C_{i,1}, C_{i,2})_{i \in [n]}, C_{v,1}, C_{v,2}, S_{ori}, I_v, (s_i)_{i \in [n]}, s_v, s, chk, td, r')$.

In some embodiments, the offline data encryption unit 706 may select a first revocation set $S_{ori} = \{I_{ori,1}, \ldots, I_{ori,n}\}$ randomly (the first revocation set includes members to be revoked), obtain a Hash function pair (chk, td), wherein chk and td denote parameters, select a random number r', determine a dynamic authentication $I_v$, select a random number s and random exponents $s_i$ and $s_v$, determine cipher texts $C_0 = g^s$, $C_{i,1} = g^{bs_i}$, $C_{i,2} = (g^{b^2 I} h^b)^{s_i}$, $C_{v,1} = g^{bs_v}$, and $C_{v,2} = (g^{b^2 I_v} h^b)^{s_v}$, determine the session key key1 of the offline data based on the equation $key1 = e(g,g)^{\alpha s}$, and determine the proxy cipher text ict of the offline data based on the equation $ict = (key1, C_0, (C_{i,1}, C_{i,2})_{i \in [n]}, C_{v,1}, C_{v,2}, S_{ori}, I_v, (s_i)_{i \in [n]}, s_v, s, chk, td, r')$. where UCHash is a chameleon hash function.

In some embodiments, the online data encryption unit 708 may be further configured to obtaining the second revocation set $S = \{I_1, \ldots, I_{|S|}\}$, determine $I_{mall,i} = (I_i - I_{ori,i}) \cdot s_i$; determine the cipher text r, $i \in [|S|]$, the cipher text $r = UColl$ (td, $I_{ori,1} \| \ldots \| I_{ori,|S|}$, r', X), $X = C_0 \| \{C_{i,1} \| C_{i,2}\}_{i \in [|S|]} \| C_{v,1} \| C_{v,2} \| \{I_{mall,i}\}_{i \in [|S|]}$, the session key of the online data $key2 = e(g,g)^{\alpha s}$, the proxy cipher text of the online data $ct = (C_0, (C_{i,1}, C_{i,2})_{i \in [|S|]}, C_{v,1}, C_{v2}, \{I_{mall,i}\}_{i \in [|S|]}, chk, r)$.

In some embodiments, the online data encryption unit 508 may be configured to o obtaining the second revocation set $S = \{I_1, \ldots, I_{|S|}\}$, determine $I_{mall,i} = (I_i - I_{ori,i}) \cdot s_i$, determine the cipher text r based on the equation $r = UColl(td, I_{ori,1} \| \ldots \| I_{ori,|S|}, r', X)$, determine the session key key2 of the online data based on the equation $key2 = e(g,g)^{\alpha s}$, and determine the proxy cipher text ct of the online data based on the equation $ct = (C_0, (C_{i,1}, C_{i,2})_{i \in [|S|]}, C_{v,1}, C_{v2}, \{I_{mall,i}\}_{i \in [|S|]}, chk, r)$, where $i \in [|S|]$, UColl denotes a collision hash function, $X = C_0 \| \{C_{i,1} \| C_{i,2}\}_{i \in [|S|]} \| C_{v,1} \| C_{v,2} \| \{I_{mall,i}\}_{i \in [|S|]}$.

In another aspect of the present disclosure, a fine-grained mobile access decryption system is provided. The system may include a decryption module. The decryption module may be configured to verify an identify attribute of a user, generate a session key key based on the identify attribute, and decrypt, based on a public key parameter pp, a private key of the user $sk_I$, and the session key key, a proxy cipher text of offline data ict and a proxy cipher text of online data ct.

The decryption module may verify an identify attribute of a user, generate a session key key based on the identify attribute of the user, and decrypt, based on the public key parameter pp, the private key of the user $sk_I$, and the session key key, the proxy cipher text ict of offline data and the proxy cipher text ct of online data. The security of the decryption may be ensured, and the calculation time of the decryption process may be reduced simultaneously, such that the efficiency of the decryption may be improved.

In some embodiments, the public key parameter $pp = (g, g^b, g^{b^2}, h^b, e(g,g)^\alpha, UCH, R)$, g and h denote random numbers, $\alpha$ and b denote random exponents, e denotes a mapping function, UCH denotes a Hash function, R denotes an auxiliary parameter domain, the private key of the user $sk_I = (d_0, d_1, d_2) = (g^\alpha g^{b^2 t}, (g^{b \cdot I} h)^t, g^{-t})$, I denotes the identity attribute, t denotes a random exponent, the proxy cipher text ict of the offline data $ict = (key1, C_0, (C_{i,1}, C_{i,2})_{i \in [n]}, C_{v,1}, C_{v,2}, S_{ori}, I_v, (s_i)_{i \in [n]}, s_v, s, chk, td, r')$, wherein, $key1 = e(g,g)^{\alpha s}$, $C_0 = g^s$, $C_{i,1} = g^{bs_i}$, $C_{i,2} = (g^{b^2 I} h^b)^{s_i}$, $C_{v,1} = g^{bs_v}$, $C_{v,2} = (g^{b^2 I_v} h^b)^{s_v}$, $S_{ori}\{I_{ori,1}, \ldots, I_{ori,n}\}$ denotes the first revocation set, the dynamic authentication $I_v = UCHash(chk, I_{ori,1} \| \ldots \| I_{ori,n}, r')$, $s \in Z_p$, $s_v \in Z_p$, (chk, td) denotes the Hash function pair, r' denotes the random number, v denotes the validation domain, n denotes the number of revoked users, $I_i \in u$, $i \in [n]$, $n=|S_{ori}|$ and the proxy cipher text of the online data $ct=(C_0, (C_{i,1}, C_{i,2})_{i\in[|S|]}, C_{v,1}, C_{v,2}, \{I_{mall,i}\}_{i\in[|S|]}, chk, r)$, $S=\{I_1, \ldots, I_{|S|}\}$ denotes the second revocation set, $r=UColl(td, I_{ori,1}\|\ldots\|I_{ori,|S|}, r', X)$, $I_{mall,i}=(I_i-I_{ori,i})\cdot s_i$, the cipher text $X=C_0\|\{C_{i,1}\|C_{i,2}\}_{i\in[|S|]}\|C_{v,1}\|C_{v,2}\|\{I_{mall,i}\}_{i\in[|S|]}$.

In some embodiments, the decryption module may be further configured to authenticate the dynamic authentication $I_v$, designate $C_{i,2}=C_{i,2}\cdot(g^{b^2})^{I_{mall,i}}$, select a random number $\tau_i$, verify whether a first equation and a second equation hold. The session key key may be determined as none if either the first equation or the second equation are verified to be does not hold. The session key key may be output, if the first equation and the second equation are both hold.

The first equation $$e\left(g, C_{v,1} \times \prod_{i=1}^{|S|} C_{i,1}\right) = e(C_0, g^b),$$

the second equation $$\frac{e\left(g^b, C_{v,2}^{\tau_0} \times \prod_{i=1}^{|S|} C_{v,2}^{\tau_i}\right)}{e\left(C_{v,1}^{\tau_0 I_v} \times \prod_{i=1}^{|S|} C_{i,1}^{\tau_i I_i}, g^{b^2}\right) \times e\left(C_{v,1}^{\tau_0} \times \prod_{i=1}^{|S|} C_{i,1}^{\tau_i}, h^b\right)} = 1,$$

the dynamic authentication $I_v=UCHash(chk, X, r)$, $i\in[|S|]$, $X=C_0\|\{C_{i,1}\|C_{i,2}\}_{i\in[|S|]}\|C_{v,1}\|C_{v,2}\|\{I_{mall,i}\}_{i\in[|S|]}$, $\tau_i\in[0,2^\tau]$, the session key $$key = \frac{e(C_0, d_0)}{e\left(d_1, C_{v,1}^{1/(l-I_v)} \prod_{i=1}^{|S|} C_{i,1}^{1/(l-l_i)}\right)} \cdot \frac{1}{e\left(d_2, C_{v,2}^{1/(l-I_v)} \cdot \prod_{i=1}^{|S|} C_{i,2}^{1/(l-l_i)}\right)}.$$

The decryption module may authenticate the dynamic authentication $I_v$, designate $C_{i,2}=C_{i,2}\cdot(g^{b^2})^{I_{mall,i}}$, select the random number $\tau_i$, determine the session key key as none if either the first equation or the second equation are verified to be does not hold (i.e., the session key is not existing), output the session key key if the first equation and the second equation are both hold, and decrypt the encrypted data based on session key key, the public key parameters pp, the private key $sk_I$ of the user. During this process, the security of the decryption may be improved, and the time of the decryption may be shortened.

Figure 7B:
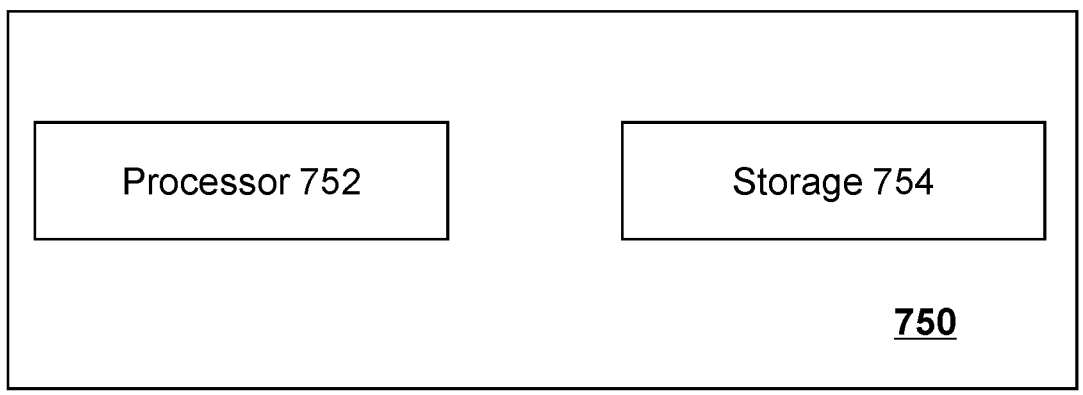
FIG. 7B is a block diagram illustrating an exemplary computing device according to some embodiments of the present disclosure.

FIG. 7B is a block diagram illustrating an exemplary computing device according to some embodiments of the present disclosure. The computing device 750 may include a processor 752, a storage 754, a set of instructions stored in the storage 754, when executed by the processor 752, the at least one set of instructions may cause the processor 752 to perform any one of the following methods for a fine-grained mobile access encryption or any one of the following methods for a fine-grained mobile access decryption.

According to the computing device 750 provided in the present disclosure, when the at processor 752 execute the computer instructions, at processor 752 may perform an initialization, generate a public key parameter pp and a master key msk based on a system security parameter λ, obtain an identity attribute of a user, generate a private key $sk_I$ of the user based on the identity attribute and the master key msk, encrypt offline data to generate a session key key1 of the offline data and a proxy cipher text ict of the offline data, and encrypt online data to generate a session key key2 of the online data and a proxy cipher text ct of the online data. During the above process, the security of the encryption may be ensured and the calculation time of the encryption process may be reduced as well, such that the efficiency of the encryption may be improved. It should be noted that the system security parameter λ is determined according to requirements for security. The requirements for security in any time or for any enterprise may not be the same. For example, the bit number of the system security parameter λ may be increased when it is not safe enough with a length of 256 bits. In some embodiments, the system security parameter λ may be a variable rather than a fixed value.

In another aspect of the present disclosure, a non-transitory computer-readable medium is provided. The non-transitory computer-readable medium may include a set of instructions. When executed by at least one processor of a computing device, the set of instructions may cause the processor to perform any one of the following methods for a fine-grained mobile access encryption or any one of the following methods for a fine-grained mobile access decryption.

According to the non-transitory computer-readable medium provided in the present disclosure, the non-transitory computer-readable medium may include a set of instructions. When the set of instructions is executed by a processor, the processor may perform an initialization, generate a public key parameter pp and a master key msk based on a system security parameter λ, obtain an identity attribute of a user, generate a private key $sk_I$ of the user based on the identity attribute and the master key msk, encrypt offline data to generate a session key key1 of the offline data and a proxy cipher text ict of the offline data, and encrypt online data to generate a session key key2 of the online data and a proxy cipher text ct of the online data. During the above process, the security of the encryption may be ensured and the calculation time of the encryption process may be reduced as well, such that the efficiency of the encryption may be improved. It should be noted that the system security parameter λ is determined according to requirements for security. The requirements for security in any time or for any enterprise may not be the same. For example, the bit number of the system security parameter λ may be increased when it is not safe enough with a length of 256 bits. In some embodiments, the system security parameter λ may be a variable rather than a fixed value.

Figure 8:
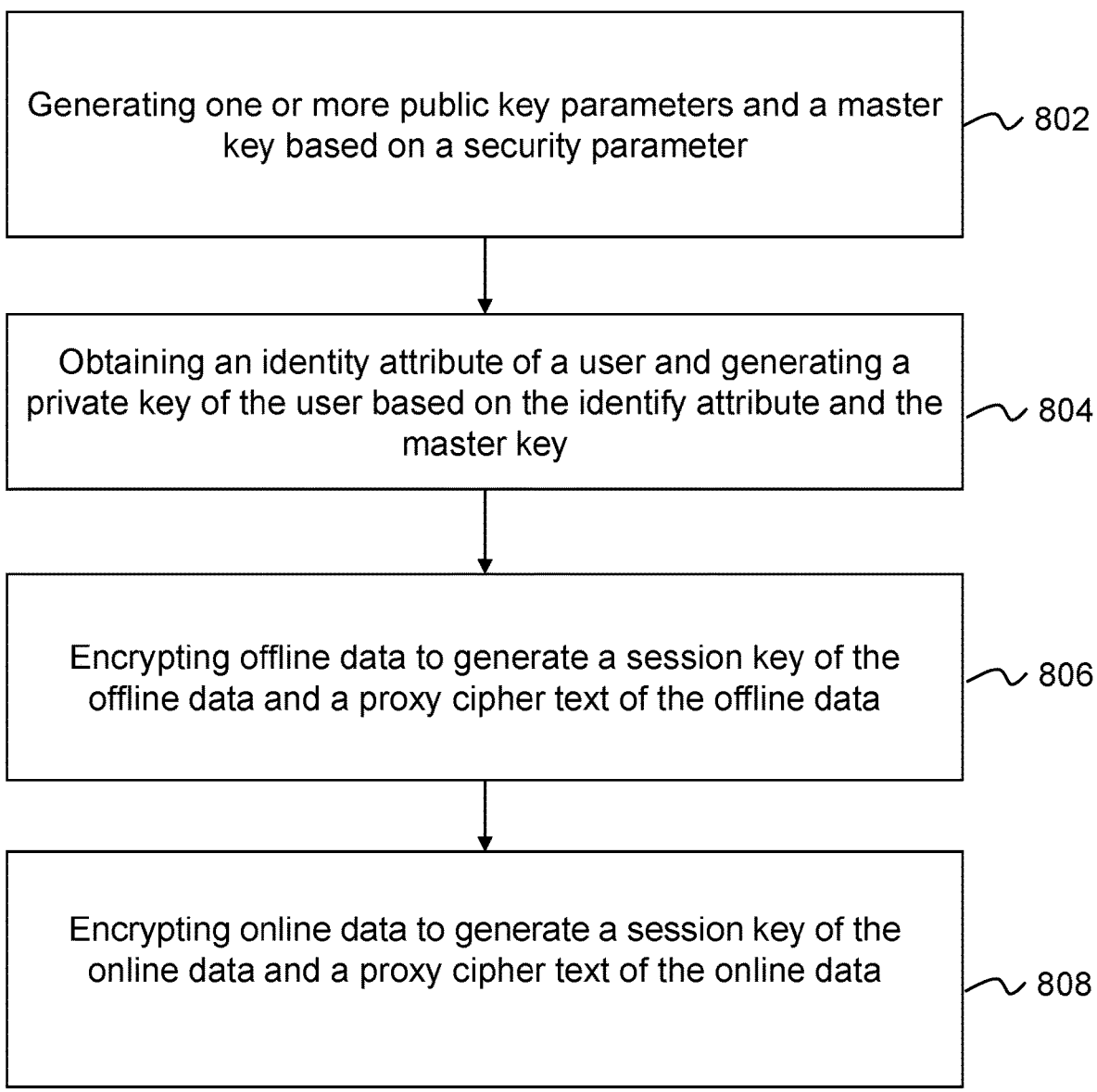
FIG. 8 is a flowchart illustrating an exemplary process for a fine-grained mobile access encryption according to some embodiments of the present disclosure.

FIG. 8 is a flowchart illustrating an exemplary process for a fine-grained mobile access encryption according to some embodiments of the present disclosure. In some embodiments, the process 800 may be implemented in the data transmission system 100. For example, the process 800 may be stored in the storage 120 and/or the storage (e.g., a ROM, a RAM, etc.) as a form of instructions, and invoked and/or executed by the server 110 (e.g., the processing engine 112 in the server 110, or the processor 752 of the processing engine 112 in the server 110).

In 802, a public key parameter pp and a master key msk may be generated based on a system security parameter λ.

In 804, an identity attribute of a user may be obtained and a private key $sk_I$ of the user may be generated based on the identity attribute and the master key msk.

In 806, offline data may be encrypted to generate a session key key1 of the offline data and a proxy cipher text ict of the offline data.

In 808, online data may be encrypted to generate a session key key2 of the online data and a proxy cipher text ct of the online data.

According to the method provided in the present disclosure for a fine-grained mobile access encryption, the data transmission system 100 or a component of the data transmission system 100 (e.g., the server 110 or the processing engine 112) may perform an initialization, generate a public key parameter pp and a master key msk based on a system security parameter λ, obtain an identity attribute of a user, generate a private key $sk_I$ of the user based on the identity attribute and the master key msk, encrypt offline data to generate a session key key1 of the offline data and a proxy cipher text ict of the offline data, and encrypt online data to generate a session key key2 of the online data and a proxy cipher text ct of the online data. During the above process, the security of the encryption may be ensured and the calculation time of the encryption process may be reduced as well, such that the efficiency of the encryption may be improved. It should be noted that the system security parameter λ is determined according to requirements for security. The requirements for security in any time or for any enterprise may not be the same. For example, the bit number of the system security parameter λ may be increased when it is not safe enough with a length of 256 bits. In some embodiments, the system security parameter λ may be a variable rather than a fixed value.

FIG. 9 is a schematic diagram illustrating an exemplary method for a fine-grained mobile access encryption according to some embodiments of the present disclosure. In some embodiments, the process 900 may be implemented in the data transmission system 100. For example, the process 900 may be stored in the storage 120 and/or the storage (e.g., a ROM, a RAM, etc.) as a form of instructions, and invoked and/or executed by the server 110 (e.g., the processing engine 112 in the server 110, or the processor 752 of the processing engine 112 in the server 110).

In 902, a prime p may be determined by the PKG based on the system security parameter λ, a first group G and a second group $G_T$ may be determined based on the system security parameter λ, and one or more elements in the first group G may be mapped to the second group $G_T$ using a mapping function e to determine bilinear groups.

In 904, a revocation identity domain u and a validation domain v may be determined, a Hash function UCH and an auxiliary parameter domain R may be selected through the PKG, random numbers g and h and random exponents α and b may be determined, and a public key parameter pp and a master key msk may be generated.

In 906, a random exponent t may be selected, an identity attribute of a user may be obtained, and a private key sk1 for the user may be determined based on the random exponent t, the identity attribute $sk_I$, and the master key msk.

In 908, a first revocation set $S_{ori}=\{I_{ori,1}, \ldots, I_{ori,n}\}$ may be selected randomly; a Hash function pair (chk, td) may be obtained, a random number r' may be selected; a dynamic authentication $I_v$ may be determined, a random number s and random exponents $s_i$ and $s_v$ may be selected, cipher texts $C_0=g^s$, $C_{i,1}=g^{bs_i}$, $C_{i,2}=(g^{b^2 I_i}h^b)^{s_i}$, $C_{v,1}=g^{bs_v}$, and $C_{v,2}=(g^{b^2 I_v}h^b)^{s_v}$ may be determined, and the session key key1 of the offline data and the proxy cipher text ict of the offline data may be determined.

In 910, a second revocation set $S=\{I_1, \ldots, I_{|S|}\}$ may be obtained; $I_{mall,i}=(I_i-I_{ori,i})\cdot s_i$ may be determined, a cipher text r may be determined, and the session key key2 of the offline data and the proxy cipher text ct of the offline data may be determined.

In this embodiment, the revocation identity domain $$u = \left[0, \frac{p-1}{2}\right],$$

the validation domain $$v = \left[\frac{p+1}{2}, p-1\right], \alpha \searrow b \in Z_p,$$

the public key parameter pp=(g, $g^b$, $g^{b^2}$, $h^b$, $e(g,g)^\alpha$, UCH, R), the master key msk 32 (α, b). The data transmission system 100 or a component of the data transmission system 100 (e.g., the server 110 or the processing engine 112) may determine the prime p (e.g., a random big prime) using the PKG based on the system security parameter λ, determine a first group G and a second group $G_T$ based on the system security parameter λ, and map an element in the first group G to the second group $G_T$ using a mapping function e to determine the bilinear groups. The data transmission system 100 or a component of the data transmission system 100 (e.g., the server 110 or the processing engine 112) may determine a revocation identity domain u and a validation domain v, select a Hash function UCH and an auxiliary parameter domain R through the PKG, determine random numbers g and h and random exponents α and b in the bilinear groups, and generate a public key parameter pp. The public key parameter pp may be open to the public, and the master key msk is stored in the PKG. The revocation identity domain u defines a user's identity to revoke the right of someone within a scope. UCH: $\{0,1\}^* \to V$ indicates that a value input into the UCH has a certain number of bits composed of 0 or 1, and a value output by the UCH is v. The process for selecting the random numbers g and h and random exponents α and b may include determining an appropriate elliptic curve, for example, $Y^2=X^3+a\times X+b$, where a and b denote coefficients. The data transmission system 100 or a component of the data transmission system 100 (e.g., the server 110 or the processing engine 112) may select a value $x_1$ of the independent variable x randomly, and calculate a value $y_1$ of the dependent variable y. if a point $(x_1, y_1)$ in the first group G is mapped to the second group $G_T$, a random element may be generated. If a point in the first group G is not mapped to the second group $G_T$, the value of x may be selected sequentially until a point in the first group G is mapped to the second group $G_T$. The principle used when random numbers or random exponents are selected may be similar as what is described below in the present disclosure. The hash function UCH may be any hash function.

In this embodiment, the random exponent $t \in Z_p$, I denotes identity attribute of the user, the private key of the user $sk_I=(d_0, d_1, d_2)=(g^\alpha g^{b^2 t}, (g^{b\cdot I}h)^t, g^{-t})$. The data transmission system 100 or a component of the data transmission system 100 (e.g., the server 110 or the processing engine 112) may select the random exponent t through the PKG, obtain the identity attribute I of a user, and generate, based on the random exponent t, the identity attribute I, and the master key msk, the private key $sk_I$ of the user. The private key $sk_I$ of the user may be determined through polynomial multiplication and exponentiation based on the equation $sk_I=(d_0, d_1, d_2)=(g^\alpha g^{b^2 t}, (g^{b\cdot I}h)^t, g^{-t})$.

In this embodiment, n denotes the number of revoked users, $I_i \in u$, $i \in [n]$, $n=|S_{ori}|$, $I_v=$UCHash(chk, $I_{ori,1}\| \ldots \|I_{ori,n}$, r'), $s \in Z_p$, the dynamic authentication $s_v \in Z_p$, the session key of the offline data key1=$e(g,g)^{\alpha s}$, the proxy cipher text of the offline data ict=(ket1, $C_0$, $(C_{i,1}, C_{i,2})_{i \in [n]}$, $C_{v,1}$, $C_{v,2}$, $S_{ori}$, $I_v$, $(s_i)_{i \in [n]}$, $s_v$, s, chk, td, r').

The data transmission system 100 or a component of the data transmission system 100 (e.g., the server 110 or the processing engine 112) may select a first revocation set $S_{ori} = \{I_{ori,1}, \ldots, I_{ori,n}\}$ randomly (the first revocation set includes members to be revoked), obtain a Hash function pair (chk, td), wherein chk and td denote parameters, select a random number r', determine a dynamic authentication $I_v$, select a random number s and random exponents $s_i$ and $s_v$, determine cipher texts $C_0 = g^s$, $C_{i,1} = g^{bs_i}$, $C_{i,2} = (g^{b^2 I_i} h^b)^{s_i}$, $C_{v,1} = g^{bs_v}$, and $C_{v,2} = (g^{b^2 I_v} h^b)^{s_v}$, determine the session key key1 of the offline data based on the equation key1=$e(g,g)^{\alpha s}$, and determine the proxy cipher text ict of the offline data based on the equation ict=(ket1, $C_0$, $(C_{i,1}, C_{i,2})_{i \in [n]}$, $C_{v,1}$, $C_{v,2}$, $S_{ori}$, $I_v$, $(s_i)_{i \in [n]}$, $s_v$, s, chk, td, r'), where UCHash is a chameleon hash function.

In this embodiment, $i \in [|S|]$, the cipher text r=UColl(td, $I_{ori,1}\|\ldots\|I_{ori,|S|}$, r', X), $X=C_0\|\{C_{i,1}\|C_{i,2}\}_{i \in [|S|]}\|C_{v,1}\|C_{v,2}\|\{I_{mall,i}\}_{i \in [|S|]}$, the session key of the online data key2=$e(g,g)^{\alpha s}$, the proxy cipher text of the online data ct=($C_0$, $(C_{i,1}, C_{i,2})_{i \in [|S|]}$, $C_{v,1}$, $C_{v,2}$, $\{I_{mall,i}\}_{i \in [|S|]}$, chk, r). The data transmission system 100 or a component of the data transmission system 100 (e.g., the server 110 or the processing engine 112) may determine $I_{mall,i} = (I_i - I_{ori,i}) \cdot s_i$ by obtaining a second revocation set $S = \{I_1, \ldots, I_{|S|}\}$, determine a cipher text r based on the equation r=UColl(td, $I_{ori,1}\|\ldots\|I_{ori,|S|}$, r', X), determine the session key key2 of the online data based on the equation key2=$e(g,g)^{\alpha s}$, and determine the proxy cipher text ct of the online data based on the equation ct=($C_0$, $(C_{i,1}, C_{i,2})_{i \in [|S|]}$, $C_{v,1}$, $C_{v,2}$, $\{I_{mall,i}\}_{i \in [|S|]}$, chk, r), where $i \in [|S|]$, UColl denotes a collision hash function, $X=C_0\|\{C_{i,1}\|C_{i,2}\}_{i \in [|S|]}\|C_{v,1}\|C_{v,2}\|\{I_{mall,i}\}_{i \in [|S|]}$.

Figure 10:
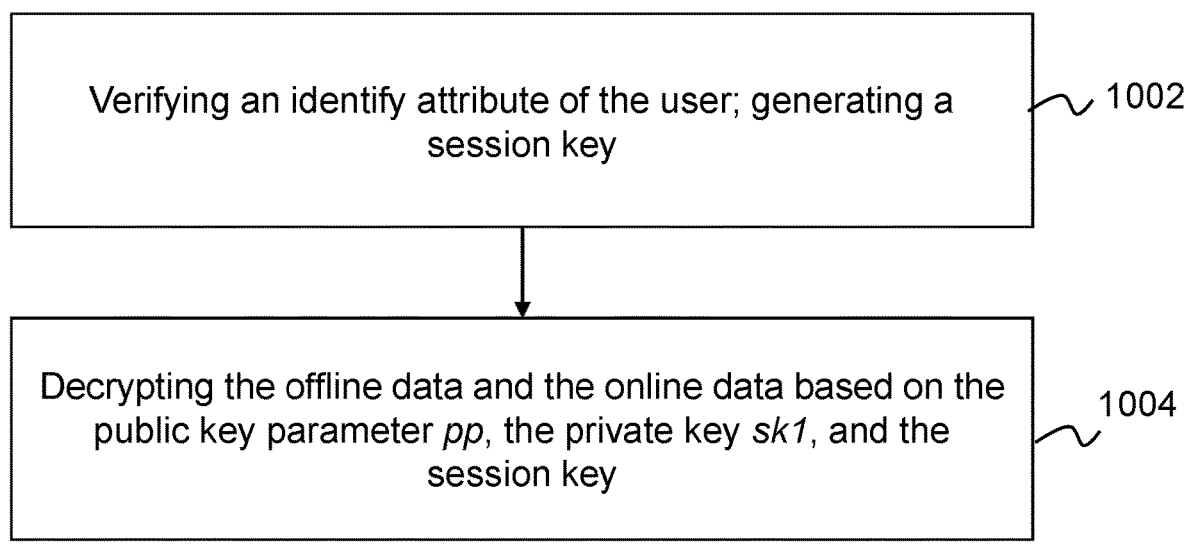
FIG. 10 is a flowchart illustrating an exemplary process for a fine-grained mobile access decryption according to some embodiments of the present disclosure.

FIG. 10 is a flowchart illustrating an exemplary process for a fine-grained mobile access decryption according to some embodiments of the present disclosure. In some embodiments, the process 1000 may be implemented in the data transmission system 100. For example, the process 1000 may be stored in the storage 120 and/or the storage (e.g., a ROM, a RAM, etc.) as a form of instructions, and invoked and/or executed by the server 110 (e.g., the processing engine 112 in the server 110, or the processor 752 of the processing engine 112 in the server 110).

In 1002, an identity attribute of the user may be verified, and a session key key may be generated.

In 1004, a proxy cipher text ict of the offline data and a proxy cipher text ct of the online data may be decrypted based on the public key parameter pp, the private key $sk_I$, and the session key key.

According to the method provided in the present disclosure for a fine-grained mobile access decryption, the data transmission system 100 or a component of the data transmission system 100 (e.g., the server 110 or the processing engine 112) may verify an identity attribute of a user, generate a session key key based on the identity attribute of the user, and decrypt, based on the public key parameter pp, the private key of the user $sk_I$, and the session key key, the proxy cipher text ict of offline data and the proxy cipher text ct of online data. During this process, the security of decryption may be ensured, and the calculation time of the decryption process may be reduced simultaneously, such that the efficiency of the decryption may be improved.

In the above embodiment, the public key parameter pp=(g, $g^b$, $g^{b^2}$, $h^b$, $e(g,g)^\alpha$, UCH, R), g and h denote random numbers, $\alpha$ and b denote random exponents, e denotes a mapping function, UCH denotes a Hash function, R denotes an auxiliary parameter domain, the private key of the user $sk_I = (d_0, d_1, d_2) = (g^\alpha g^{b^2 t}, (g^{b \cdot I} h)^t, g^{-t})$, I denotes the identity attribute, t denotes a random exponent, the proxy cipher text ict of the offline data ict=(ket1, $C_0$, $(C_{i,1}, C_{i,2})_{i \in [n]}$, $C_{v,1}$, $C_{v,2}$, $S_{ori}$, $I_v$, $(s_i)_{i \in [n]}$, $s_v$, s, chk, td, r'), wherein, key1=$e(g,g)^{\alpha s}$, $C_0 = g^s$, $C_{i,1} = g^{bs_i}$, $C_{i,2} = (g^{b^2 I_i} h^b)^{s_i}$, $C_{v,1} = g^{bs_v}$, $C_{v,2} = (g^{b^2 I_v} h^b)^{s_v}$, $S_{ori}\{I_{ori,1}, \ldots, I_{ori,n}\}$ denotes the first revocation set, the dynamic authentication $I_v$=UCHash(chk, $I_{ori,1}\|\ldots\|I_{ori,n}$, r'), $s \in Z_p$, $s_v \in Z_p$, (chk, td) denotes the Hash function pair, r' denotes the random number, v denotes the validation domain, n denotes the number of revoked users, $I_i \in u$, $i \in [n]$, n=$|S_{ori}|$ and the proxy cipher text of the online data ct=($C_0$, $(C_{i,1}, C_{i,2})_{i \in [|S|]}$, $C_{v,1}$, $C_{v,2}$, $\{I_{mall,i}\}_{i \in [|S|]}$, chk, r), $S=\{I_1, \ldots, I_{|S|}\}$ denotes the second revocation set, r=UColl(td, $I_{ori,1}\|\ldots\|I_{ori,|S|}$, r', X), $I_{mall,i} = (I_i - I_{ori,i}) \cdot s_i$, the cipher text $X=C_0\|\{C_{i,1}\|C_{i,2}\}_{i \in [|S|]}\|C_{v,1}\|C_{v,2}\|\{I_{mall,i}\}_{i \in [|S|]}$.

Figure 11:
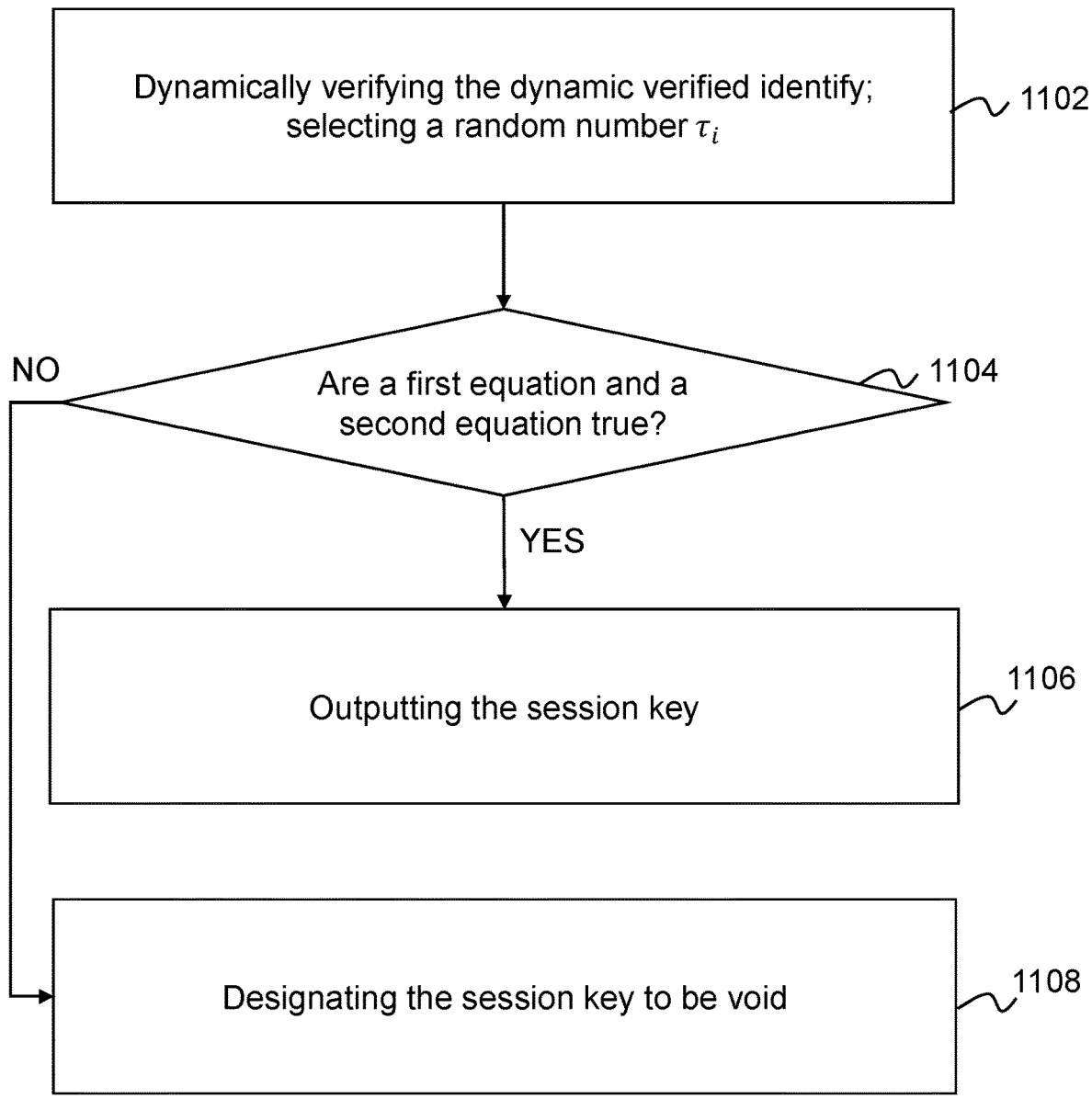
FIG. 11 is a flowchart illustrating an exemplary process for a fine-grained mobile access decryption according to some embodiments of the present disclosure.

FIG. 11 is a flowchart illustrating an exemplary process for a fine-grained mobile access decryption according to some embodiments of the present disclosure. In some embodiments, the process 1100 may be implemented in the data transmission system 100. For example, the process 1100 may be stored in the storage 120 and/or the storage (e.g., a ROM, a RAM, etc.) as a form of instructions, and invoked and/or executed by the server 110 (e.g., the processing engine 112 in the server 110, or the processor 752 of the processing engine 112 in the server 110).

In 1102, the dynamic authentication $I_v$ may be authenticated, $C_{i,2} = C_{i,2} \cdot (g^{b^2})^{I_{mall,i}}$, and a random number $\tau_i$ may be selected.

In 1104, a determination as to whether a first equation and a second equation hold is verified.

In 1106, the session key key may be determined as none if either the first equation or the second equation are verified to be does not hold.

In 1108, the session key key may be output, if the first equation and the second equation are both hold.

In this embodiment, the first equation $$e\left(g, C_{v,1} \times \prod_{i=1}^{|S|} C_{i,1}\right) = e(C_0, g^b),$$

the second equation $$\frac{e\left(g^b, C_{v,2}^{\tau_0} \times \prod_{i=1}^{|S|} C_{v,2}^{\tau_i}\right)}{e\left(C_{v,1}^{\tau_0 I_v} \times \prod_{i=1}^{|S|} C_{i,1}^{\tau_i I_i}, g^{b^2}\right) \times e\left(C_{v,1}^{\tau_0} \times \prod_{i=1}^{|S|} C_{i,1}^{\tau_i}, h^b\right)} = 1,$$

the dynamic authentication $I_v$=UCHash(chk, X, r), $i \in [|S|]$, $X=C_0\|\{C_{i,1}\|C_{i,2}\}_{i \in [|S|]}\|C_{v,1}\|C_{v,2}\|\{I_{mall,i}\}_{i \in [|S|]}$, $\tau_i \in [0, 2^\tau]$, the session key $$key = \frac{e(C_0, d_0)}{e\left(d_1, C_{v,1}^{1/(I-I_v)} \prod_{i=1}^{|S|} C_{i,1}^{1/(I-I_i)}\right)} \cdot \frac{1}{e\left(d_2, C_{v,2}^{1/(I-I_v)} \cdot \prod_{i=1}^{|S|} C_{i,2}^{1/(I-I_i)}\right)}.$$

The data transmission system 100 or a component of the data transmission system 100 (e.g., the server 110 or the processing engine 112) may authenticate the dynamic authentication $I_v$, designate $C_{i,2}=C_{i,2}\cdot(g^{b^2})^{I_{mall,i}}$, select the random number $\tau_i$, determine the session key key as none if either the first equation or the second equation are verified to be does not hold (i.e., the session key is not existing), output the session key key if the first equation and the second equation are both hold, and decrypt the encrypted data based on session key key, the public key parameters pp, the private key $sk_I$ of the user. During this process, the security of the decryption may be improved, and the time of the decryption may be shortened.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for a fine-grained mobile access encryption, comprising:
   generating one or more public key parameters pp and a master key msk based on a system security parameter $\lambda$, wherein the generating the one or more public key parameters pp and the master key msk based on the system security parameter $\lambda$ comprises:
   determining a prime p and bilinear groups by a private key generator (PKG) based on the system security parameter $\lambda$;
   determining a revocation identity domain u and a validation domain v;
   selecting a Hash function UCH and an auxiliary parameter domain R through the PKG;
   selecting random numbers g and h and random exponents $\alpha$ and b from the bilinear groups through the PKG; and
   generating the one or more public key parameters pp and the master key msk, wherein $$u = \left[0, \frac{p-1}{2}\right], v = \left[\frac{p+1}{2}, p-1\right], \alpha, b \in Z_p,$$

pp=(g, $g^b$, $g^{b^2}$, $h^b$, $e(g,g)^\alpha$, UCH, R), e denotes a mapping function for determining bilinear groups, and msk=($\alpha$, b);
  obtaining an identity attribute of a user;
  generating a private key $sk_I$ of the user based on the identity attribute and the master key msk;
  encrypting offline data to generate a session key key1 of the offline data and a proxy cipher text ict of the offline data; and
  encrypting online data to generate a session key key2 of the online data and a proxy cipher text ct of the online data.

2. The method of claim 1, wherein the determining the prime p and the bilinear groups by the PKG based on the system security parameter $\lambda$ comprises:
  determining the prime p by the PKG based on the system security parameter $\lambda$;
  determining a first group G and a second group $G_T$ based on the system security parameter $\lambda$; and
  mapping one or more elements in the first group G to the second group $G_T$ using a mapping function to determine the bilinear groups.

3. The method of claim 1, wherein the generating the private key $sk_I$ of the user based on the identity attribute and the master key msk comprises:
  selecting a random exponent t through the PKG;
  obtaining the identity attribute of the user; and
  generating the private key $sk_I$ of the user based on the random exponent t, the identity attribute, and the master key msk,
  wherein $sk_I=(d_0, d_1, d_2)=(g^\alpha, g^{b^2 t}, (g^{b \cdot I} h)^t, g^{-t})$, $d_0$, $d_1$, and $d_2$ are components of the private key $sk_I$, $t \in Z_p$, I denotes the identity attribute of the user.

4. The method of claim 3, wherein the encrypting the offline data to generate the session key key1 of the offline data and the proxy cipher text ict of the offline data comprises:
  randomly selecting a first revocation set $S_{ori}=\{I_{ori,1}, \ldots, I_{ori,n}\}$;
  obtaining a Hash function pair (chk, td), wherein chk and td are two parameters of the Hash function pair;
  selecting a random number r';
  determining a dynamic authentication $I_v$;
  selecting a random number s and random exponents $s_i$ and $s_v$;
  determining cipher texts $C_0=g^s$, $C_{i,1}=g^{bs_i}$, $C_{i,2}=(g^{b^2 I}h^b)^{s_i}$, $C_{v,1}=g^{bs_v}$, and $C_{v,2}=(g^{b^2 I_v}h^b)^{s_v}$; and
  determining the session key key1 of the offline data and the proxy cipher text ict of the offline data,
  wherein, n denotes a count of revoked users, $I_i \in u$, $i \in [n]$, $n=|S_{ori}|$, $I_v$=UCHash(chk, $I_{ori,1}\| \ldots \|I_{ori,n}$, r'), UCHash denotes a chameleon hash function, $s \in Z_p$, $s_i \in Z_p$, $s_v \in Z_p$, key1=$e(g,g)^{\alpha s}$, and ict=(key1, $C_0$, $(C_{i,1}, C_{i,2})_{i \in [n]}$, $C_{v,1}$, $C_{v,2}$, $S_{ori}$, $I_v$, $(s_i)_{i \in [n]}$, $s_v$, s, chk, td, r').

5. The method of claim 4, wherein the encrypting online data to generate the session key key2 of the online data and the proxy cipher text ct of the online data comprises:
  obtaining a second revocation set $S=\{I_1, \ldots, I_{|S|}\}$;
  determining $I_{mall,i}=(I_i-I_{ori,i}) \cdot s_i$;
  determining a cipher text r; and
  determining the session key key2 of the online data and the proxy cipher text ct of the online data, wherein $i \in [|S|]$, r=UColl(td, $I_{ori,1}\|\ldots\|I_{ori,|S|}$, r', X), UColl denotes a collision hash function, X= $C_0\|\{C_{i,1}\|C_{i,2}\}_{i \in [|S|]}\|C_{v,1}\|C_{v,2}\|\{I_{mall,i}\}_{i \in [|S|]}$, key2=$e(g, g)^{\alpha s}$, and ct=($C_0$, $(C_{i,1}, C_{i,2})_{i \in [|S|]}$, $C_{v,1}$, $C_{v,2}$, $\{I_{mall,i}\}_{i \in [|S|]}$, chk, r).

6. A fine-grained mobile access encryption system, comprising:
  at least one storage medium storing a set of instructions; and
  at least one hardware processor configured to communicate with the at least one storage medium, wherein when executing the set of instructions, the at least one hardware processor is directed to:
    generate one or more public key parameters pp and a master key msk based on a system security parameter $\lambda$, wherein to generate the one or more public key parameters pp and the master key msk based on the system security parameter $\lambda$, the at least one hardware processor is directed to:
      determine a prime p and bilinear groups by a private key generator (PKG) based on the system security parameter $\lambda$;
      determine a revocation identity domain u and a validation domain v;
      select a Hash function UCH and an auxiliary parameter domain R through the PKG;
      select random numbers g and h and random exponents $\alpha$ and b from the bilinear groups through the PKG; and
      generate the one or more public key parameters pp and the master key msk, wherein $$u = \left[0, \frac{p-1}{2}\right], v = \left[\frac{p+1}{2}, p-1\right], \alpha, b \in Z_p,$$

pp=(g, $g^b$, $g^{b^2}$, $h^b$, $e(g,g)^\alpha$, UCH, R) e denotes a mapping function for determining bilinear groups, and msk=($\alpha$, b);
  obtain an identity attribute of a user; and
  generate a private key $sk_I$ of the user based on the identity attribute and the master key;
  encrypt offline data to generate a session key key1 of the offline data and a proxy cipher text ict of the offline data; and
  encrypt online data to generate a session key key2 of the online data and a proxy cipher text ct of the online data.

7. The system of claim 6, wherein the at least one hardware processor is further directed to:
  determine the prime p by the PKG based on the system security parameter $\lambda$;
  determine a first group G and a second group $G_T$ based on the system security parameter $\lambda$; and
  map one or more elements in the first group G to the second group $G_T$ using a mapping function e to determine the bilinear groups.

8. The system of claim 6, wherein the at least one hardware processor is further directed to:
  select a random exponent t through the PKG;
  obtain the identity attribute of the user; and
  generate the private key $sk_I$ of the user based on the random exponent t, the identity attribute, and the master key msk,
  wherein $sk_I=(d_0, d_1, d_2)=(g^\alpha, g^{b^2 t}, (g^{b \cdot I} h)^t, g^{-t})$, $d_0$, $d_1$, and $d_2$ are components of the private key $sk_I$, $t \in Z_p$, I denotes the identity attribute of the user.

9. The system of claim 8, wherein the at least one hardware processor is further directed to:
   randomly select a first revocation set $S_{ori} = \{I_{ori,1}, \ldots, I_{ori,n}\}$;
   obtain a Hash function pair (chk, td), wherein chk and td are two parameters of the Hash function pair;
   select a random number r';
   determine a dynamic authentication $I_v$;
   select a random number s and random exponents $s_i$ and $s_v$;
   determine cipher texts $C_0 = g^s$, $C_{i,1} = g^{bs_i}$, $C_{i,2} = (g^{b^2 I_i} h^b)^{s_i}$, $C_{v,1} = g^{bs_v}$, and $C_{v,2} = (g^{b^2 I_v} h^b)^{s_v}$; and
   determine the session key key1 of the offline data and the proxy cipher text ict of the offline data,
   wherein, n denotes a count of revoked users, $I_i \in u$, $i \in [n]$, $n = |S_{ori}|$, $I_v = \text{UCHash}(\text{chk}, I_{ori,1} \| \ldots \| I_{ori,n}, r')$, UCHash denotes a chameleon hash function, $s \in Z_p$, $s_i \in Z_p$, $s_v \in Z_p$, $\text{key1} = e(g,g)^{\alpha s}$, and $\text{ict} = (\text{key1}, C_0, (C_{i,1}, C_{i,2})_{i \in [n]}, C_{v,1}, C_{v,2}, S_{ori}, I_v, (s_i)_{i \in [n]}, s_v, s, \text{chk}, \text{td}, r')$.

10. The system of claim 9, wherein the at least one hardware processor is further directed to:
   obtain a second revocation set $S = \{I_1, \ldots, I_{|S|}\}$;
   determine $I_{mall,i} = (I_i - I_{ori,i}) \cdot s_i$;
   determine a cipher text r; and
   determine the session key key2 of the online data and the proxy cipher text ct of the online data,
   wherein $i \in [|S|]$, $r = \text{UColl}(\text{td}, I_{ori,1} \| \ldots \| I_{ori,|S|}, r', X)$, UColl denotes a collision has function, $X = C_0 \| \{C_{i,1} \| C_{i,2}\}_{i \in [|S|]} \| C_{v,1} \| C_{v,2} \| \{I_{mall,i}\}_{i \in [|S|]}$, $\text{key2} = e(g,g)^{\alpha s}$, and $\text{ct} = (C_0, (C_{i,1}, C_{i,2})_{i \in [|S|]}, C_{v,1}, C_{v,2}, \{I_{mall,i}\}_{i \in [|S|]}, \text{chk}, r)$.

* * * * *